(12) United States Patent
Sarlioglu et al.

(10) Patent No.: US 12,212,217 B2
(45) Date of Patent: Jan. 28, 2025

(54) SYSTEM AND METHOD FOR ELECTRIC MACHINE COOLING

(71) Applicant: Wisconsin Alumni Research Foundation (WARF), Madison, WI (US)

(72) Inventors: Bulent Sarlioglu, Madison, WI (US); Gokhan Cakal, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 267 days.

(21) Appl. No.: 17/743,707

(22) Filed: May 13, 2022

(65) Prior Publication Data

US 2023/0369945 A1 Nov. 16, 2023

(51) Int. Cl.
*H02K 9/19* (2006.01)
*H02K 1/16* (2006.01)
*H02K 3/12* (2006.01)

(52) U.S. Cl.
CPC ............. *H02K 9/19* (2013.01); *H02K 1/16* (2013.01); *H02K 3/12* (2013.01)

(58) Field of Classification Search
CPC .............. H02K 1/16; H02K 3/12; H02K 1/20
USPC ......................................................... 310/54
See application file for complete search history.

(56) References Cited

U.S. PATENT DOCUMENTS

| | | | | |
|---|---|---|---|---|
| 2,099,575 A * | 11/1937 | Savage | ................... | H02K 9/19 165/47 |
| 2,154,216 A * | 4/1939 | Savage | ................... | H02K 1/20 165/170 |
| 5,473,207 A * | 12/1995 | Hopeck | ................... | H02K 1/20 310/65 |
| 6,583,526 B2 | 6/2003 | Griffith et al. | | |
| 10,361,597 B2 | 7/2019 | Juris | | |
| 10,411,563 B2 | 9/2019 | Rippel et al. | | |
| 10,790,728 B2 | 9/2020 | Rippel et al. | | |
| 2006/0174643 A1* | 8/2006 | Ostrom | ............... | F28D 15/0266 62/119 |
| 2014/0070640 A1* | 3/2014 | Tolpadi | ................... | H02K 1/20 310/59 |

(Continued)

OTHER PUBLICATIONS

JP 58063047; Watabe et al. (Year: 1983).*

(Continued)

*Primary Examiner* — Ahmed Elnakib
(74) *Attorney, Agent, or Firm* — Amundsen Davis, LLC

(57) ABSTRACT

Stator packages and electric machines, and methods for cooling same, are disclosed herein. In an example embodiment, an electric machine includes a rotor, and a stator package having one or more stator coils, stator core portions, and a heat exchanger. The stator core portions and heat exchanger are arranged successively along a central axis, with the heat exchanger being positioned between the stator core portions. Each of the stator coils is arranged to extend along/within the stator core portions and heat exchanger. The heat exchanger includes walls forming passageways configured so that coolant entering the heat exchanger via an inlet both flows circumferentially from the inlet to an outlet, and additionally flows in an undulating manner both radially inwardly and outwardly substantially in between outer and inner wall surfaces of the heat exchanger, such that the coolant cools the one or more stator coils and the stator core portions.

20 Claims, 9 Drawing Sheets

(56) References Cited

U.S. PATENT DOCUMENTS

| | | | |
|---|---|---|---|
| 2014/0284038 A1* | 9/2014 | Vedula | B22F 5/106 165/185 |
| 2014/0300220 A1 | 10/2014 | Marvin | |
| 2023/0369945 A1* | 11/2023 | Sarlioglu | H02K 1/20 |

OTHER PUBLICATIONS

Chong et al., "Review of Advanced Cooling Systems of Modern Electric Machines for EMobility Application," 2021 IEEE Workshop on Electrical Machines Design, Control and Diagnosis (WEMDCD), 2021, pp. 149-154.
Sixel et al., "Ceramic 3-D Printed Direct Winding Heat Exchangers for Thermal Management of Concentrated Winding Electric Machines," in IEEE Transactions on Industry Applications, vol. 57, No. 6, pp. 5829-5840, Nov.-Dec. 2021.
Fan et al., "Ventilation and Thermal Improvement of Radial Forced Air-Cooled FSCW Permanent Magnet Synchronous Wind Generators," in IEEE Transactions on Industry Applications, vol. 53, No. 4, pp. 3447-3456, Jul.-Aug. 2017.
Wu et al., "Additively Manufactured Hollow Conductors Integrated with Heat Pipes: Design Tradeoffs and Hardware Demonstration," in IEEE Transactions on Industry Applications, vol. 57, No. 4, pp. 3632-3642, Jul.-Aug. 2021.
Pyrhönen et al., "Design of Magnetic Circuits in Design of Rotating Electrical Machines," 2nd ed. Wiley, 2013, pp. 155-228.
Lipo, "Thermal Design, an Introduction to AC Machine Design," IEEE, 2018, pp. 305-357.
Madonna, et al., "Improved thermal management and analysis for stator end-windings of electrical machines," IEEE Transactions on Industrial Electronics, vol. 66, No. 7, pp. 5057-5069, Jul. 2019.
Electrical Engineering Portal, "Synchronous motor construction," Jan. 2012, Accessed on: Jan. 27, 2021, [Online]. Available: https://electrical-engineering-portal.com/synchronous-motor-construction.
Partzsch, "Pol-wheel windings," 2 pages, Accessed on: Jan. 27, 2021 [Online]. Available: https://en.partzsch.de/pol-wheel-windings.
Liu, "Cooling design and thermal analysis for dual-stator 6-slot 4-pole flux-switching permanent magnet machine," M.Sc. thesis, Univ. of Wisconsin-Madison, 2017, Accessed on: Jan. 6, 2022. (101 pages) [Online]. Available: https://minds.wisconsin.edu/.
Sickels, "BorgWarner Announces 800V electric motor for commercial vehicles," 2 pages, Feb. 22, 2021, Accessed on: Feb. 11, 2022 [Online]. Available: https://www.fleetequipmentmag.com/borgwarner-800v-electric-motor-commercial/.
Magnix, "Magni650 EPU properties," Accessed on: Feb. 11, 2022 [Online] Available: https://www.magnix.aero/services.
ABB, "ABB Expands Azipod® Power Range for Ferries and RoPax Vessels," pp. 1-7, Accessed on: Feb. 11, 2022 [Online] Available: https://new.abb.com/news/detail/24847/abb-expands-azipodr-power-range-for-ferries-and-ropax-vessels.
Solar Turbines Inc., "Gas Compressor Packages," 14 pages, Accessed on: Feb. 11, 2022 [Online] Available: https://www.solarturbines.com/en_US/products/gas-compressors.html.
Galea, et al., "Design of a High-Force-Density Tubular Motor," in IEEE Transactions on Industry Applications, vol. 50, No. 4, pp. 2523-2532, Jul.-Aug. 2014, doi: 10.1109/TIA.2014.2300190.
Avl, "E-Axle Systems for Truck and Bus," pp. 1-2, Accessed on: Feb. 11, 2022 [Online]. Available: https://www.avl.com/-/avl-e-axle-systems-for-truck-bus.
Wrobel et al., "A Feasibility Study of Additively Manufactured Heat Guides for Enhanced Heat Transfer in Electrical Machines," in IEEE Transactions on Industry Applications, vol. 56, No. 1, pp. 205-215 (2019) doi: 10.1109/TIA.2019.2949258.
Sixel et al., "Cooling of Windings in Electric Machines via 3D Printed Heat Exchanger," 2018 IEEE Energy Conversion Congress and Exposition (ECCE) (2018) pp. 229-235, doi: 10.1109/ECCE.2018.8557845.
Reinap et al., "Heat transfer analysis of a traction machine with directly cooled laminated windings," 2014 4th International Electric Drives Production Conference (EDPC) (2014) pp. 1-7, doi: 10.1109/EDPC.2014.6984395.
Semidey et al., "Experimentation of an Electric Machine Technology Demonstrator Incorporating Direct Winding Heat Exchangers," in IEEE Transactions on Industrial Electronics, vol. 61, No. 10, pp. 5771-5778 (Oct. 2014) doi: 10.1109/TIE.2014.2303779.

* cited by examiner

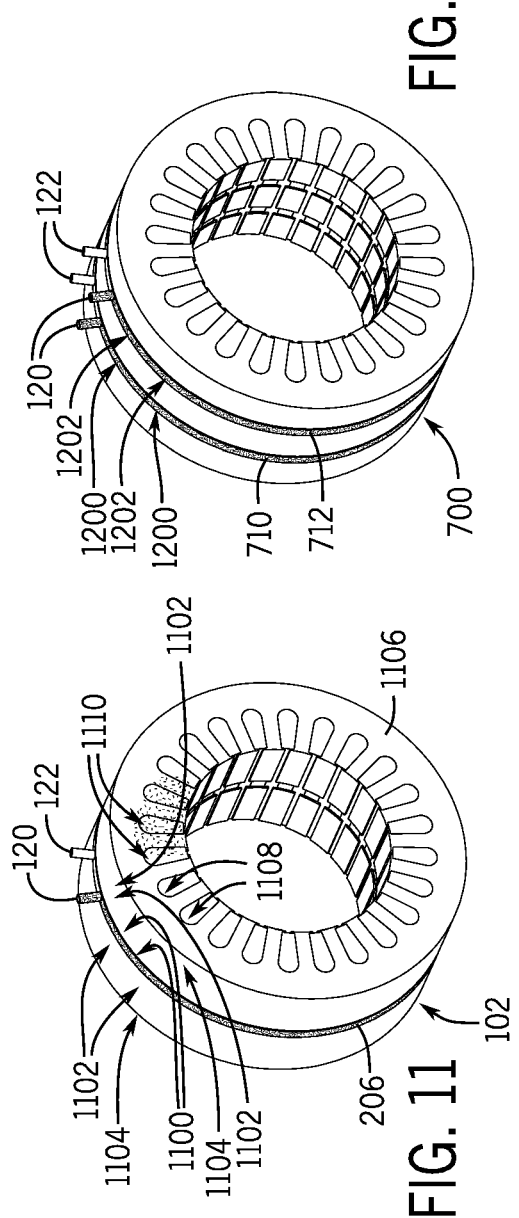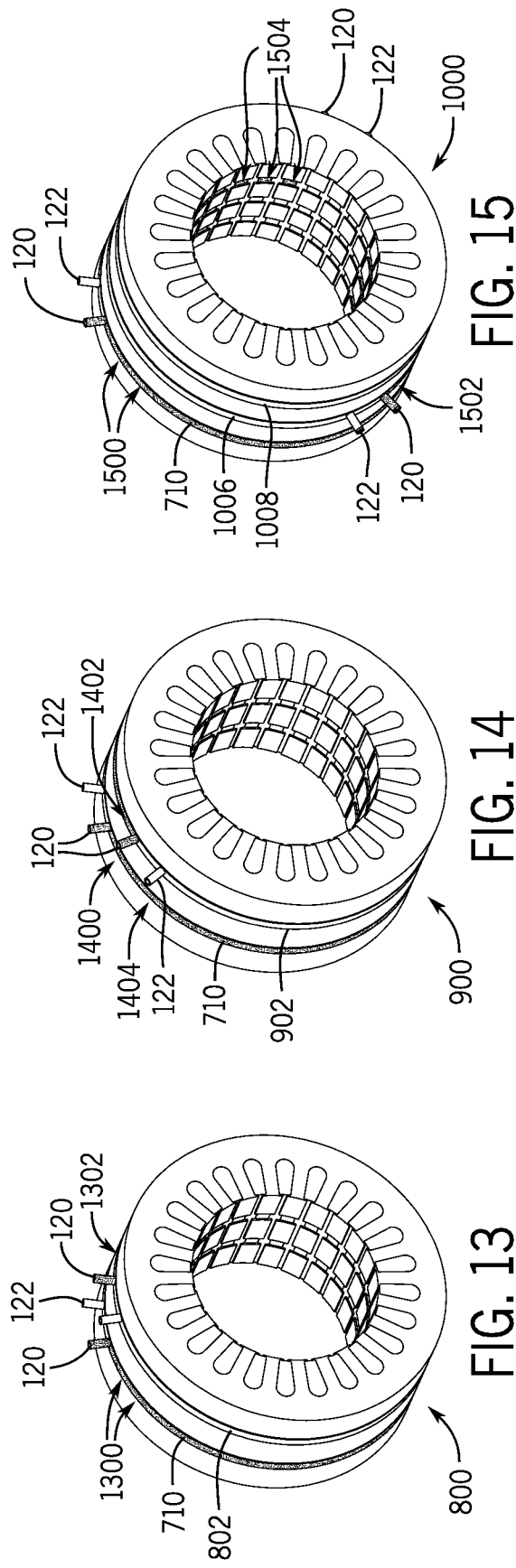

SYSTEM AND METHOD FOR ELECTRIC MACHINE COOLING

CROSS-REFERENCE TO RELATED APPLICATIONS

—

STATEMENT REGARDING FEDERALLY SPONSORED RESEARCH OR DEVELOPMENT

—

FIELD OF THE INVENTION

The present disclosure relates to electric machines such as motors and generators and, more particularly, relates to systems and methods for cooling electric machines and electric machines employing such systems and methods.

BACKGROUND OF THE INVENTION

Electrification of the powertrain in vehicles has attracted increasing attention in recent years, as people have come to recognize that the adoption of electric vehicles (EVs) can help achieve goals related to reducing greenhouse gas emissions and mitigating climate change. Electric machines with high power densities and high efficiencies are important components to such electric vehicles.

The thermal limit has become a dominant design constraint in regard to such electric machines intended for us in electric vehicles, because temperature-sensitive materials are often used to improve power and torque densities. For example, high winding temperatures will decrease the conductivity of conductors and lead to high copper loss. Also, magnet temperature management is important for permanent magnet machines to avoid demagnetization. In general, thermal management technology is highly important for electric machines.

Various cooling schemes are utilized in conventional electric machines, including air cooling, water cooling, and a combination of both. Such cooling schemes include arrangements in which a rotor or stator is cooled with radial air ducts or a single radial duct is utilized in the middle of a rotor or stator package, as well as arrangements having several radial ducts and fin-shaped structures on the rotor package. Notwithstanding such conventional technologies, a challenge remains in that current technology and design constraints still yield performance and cooling inefficiencies in electric machines.

For at least one or more of these reasons, or one or more other reasons, it would be advantageous if new or improved cooling systems for electric machines and/or electric machines having such new or improved cooling systems could be developed, and/or if new or improved methods of cooling electric machines could be developed, so as to address any one or more of the concerns discussed above or to address one or more other concerns or provide one or more benefits.

SUMMARY OF THE INVENTION

In at least one example embodiment, the present disclosure relates to a stator package for an electric machine. The stator package includes a plurality of stator coils, a first stator core portion, and a first heat exchanger. The first stator core portion is arranged along a central axis and has a first stator core yoke and a plurality of first stator core teeth respectively extending radially inwardly from the first stator core yoke to respective inner ends of the respective first stator core teeth, where respective neighboring pairs of the first stator core teeth together with the first stator core yoke substantially define respective first stator core slots. The first heat exchanger is arranged along the central axis and has a first inlet and a first outlet, a first heat exchanger yoke, and a plurality of first heat exchanger teeth extending radially inwardly from the first heat exchanger yoke to respective inner ends of the respective first heat exchanger teeth, where respective neighboring pairs of the first heat exchanger teeth together with the first heat exchanger yoke substantially define respective first heat exchanger slots. Further, the first heat exchanger is positioned adjacent to the first stator core portion, the respective first stator core slots are aligned with the respective first heat exchanger slots, and each of the stator coils extends through each of a respective one of the first stator core slots and a respective one of the first heat exchanger slots. Additionally, the first heat exchanger includes a plurality of first walls forming at least in part a plurality of first passageways configured so that coolant entering the first heat exchanger via the inlet both flows in a first direction circumferentially around at least a first portion of the heat exchanger from the inlet to the outlet, and also flows in an undulating manner both radially inwardly and radially outwardly substantially in between the first heat exchanger yoke and the respective inner ends of one or more of the first heat exchanger teeth, such that the coolant passes in proximity to and cools one or more of the stator coils and also cools the first stator core portion.

Additionally, in at least one example embodiment, the present disclosure relates to an electric machine that includes a rotor and a stator package. The stator package includes one or more stator coils, a first stator core portion, a second stator core portion, and a first heat exchanger, where the first stator core portion, second stator core portion, and first heat exchanger are arranged successively along a central axis, with the first heat exchanger being positioned adjacent to and between the first and second stator core portions. Also, each of the one or more stator coils is arranged to extend along or within each of the first stator core portion, first heat exchanger, and second stator core portion. Further, the first heat exchanger includes a first inlet and a first outlet, and also includes a plurality of first walls forming a plurality of first passageways configured so that coolant entering the first heat exchanger via the inlet both flows in a first direction circumferentially around at least a first portion of the heat exchanger from the inlet to the outlet, and additionally flows in an undulating manner both radially inwardly and radially outwardly substantially in between outer and inner wall surfaces of the heat exchanger, such that the coolant passes in proximity to and cools the one or more of the stator coils and the first and second stator core portions.

Further, in at least one example embodiment, the present disclosure relates to a method of cooling an electric machine. The method includes providing a stator package including one or more stator coils, a first stator core portion, a second stator core portion, and a first heat exchanger, where each of the first stator core portion, second stator core portion, and first heat exchanger is arranged along a central axis. The first stator core portion, first heat exchanger, and second stator core portion are arranged successively along the central axis, with the first heat exchanger being positioned adjacent to and between the first and second stator core portions. Also, each of the one or more stator coils is arranged to extend along or within each of the first stator core portion, first heat exchanger, and second stator core portion. Further, the first heat exchanger includes a first inlet and a first outlet, and also includes a plurality of first walls forming a plurality of first passageways. Additionally, the method also includes receiving coolant via the inlet, and directing the coolant to flow through the first heat exchanger from the inlet to the outlet by the plurality of first passageways due to interactions between the coolant and the plurality of first walls so that the coolant flows both a first direction circumferentially around at least a first portion of the heat exchanger from the inlet to the outlet, and additionally flows in an undulating manner both radially inwardly and radially outwardly substantially in between outer and inner wall surfaces of the heat exchanger, such that the coolant passes in proximity to the one or more of the stator coils and at least indirectly receives heat from the one or more of the stator coils so as to cool the one or more stator coils. Further, in at least some such embodiments, the method also includes receiving at least some additional heat at least indirectly from the first and second stator core portions at the coolant due to direct contact between the first heat exchanger and each of the first and second stator core portions, so as to cool the first and second stator core portions

BRIEF DESCRIPTION OF THE DRAWINGS

FIGS. 11, 12, 13, 14, and 15 respectively are additional schematic front perspective views of the first, second, third, fourth, and fifth stator packages of FIGS. 2, 7, 8, 9, and 10, respectively, which further illustrate example temperature distributions in the stator packages during operation of respective electric machines in which those stator packages are implemented;

DETAILED DESCRIPTION

Figure 1:
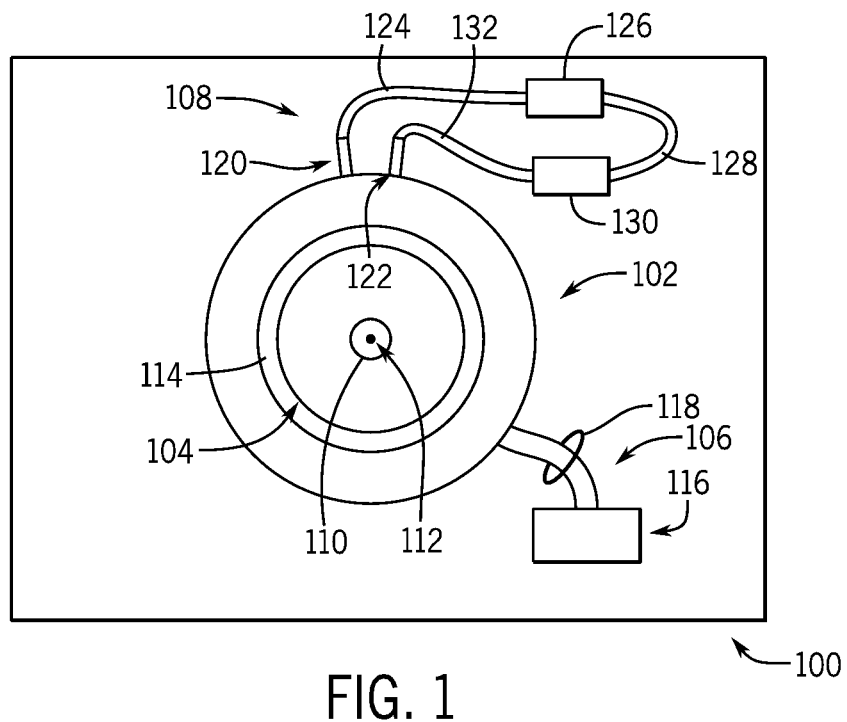
FIG. 1 is a schematic front elevation view of a first electric machine including a first stator package in accordance with a first example embodiment encompassed herein.

The present disclosure relates to a variety of electric machine thermal design approaches and associated cooling methods for implementation in regard to electric machines (such as radial flux electric machines) that allow for enhanced cooling of stator coils and/or stator cores of such electric machines by comparison with at least some conventional approaches and methods. In at least some embodiments encompassed by the present disclosure, an additively manufactured heat exchanger is placed between stator core stacks of an electric machine so as to encircle or surround stator coils. By directing coolant to flow within the heat exchanger in a circumferential direction around the stator, in an undulating (or S-shaped) manner that also includes radially inward and radially outward flow of the coolant, effective cooling of the electric machine, and particularly cooling of both the stator coils and stator core, are achieved without degradation (or without substantial degradation) in the slot fill factor.

In at least some such embodiments, the heat exchanger may include two parts, a base and a cover, each of which can be additively manufactured (or manufactured by way of 3D printing), and which can be assembled together. When assembled within the electric machine, the heat exchanger can be located at the middle of the stator package, and be sandwiched between two stator sub-stacks or stator core portions (e.g., groups of laminations) that together form the stator core. The heat exchanger, which is generally annular, has the same or substantially the same profile (e.g., as viewed axially) as that of the stator laminations of the stator core of the electric machine, in between which (or adjacent to which) the heat exchanger is positioned.

Additionally, each of the heat exchanger and the stator laminations of the stator core have respective slots, within which are positioned respective stator coils of the electric machine. In some embodiments, the heat exchanger has a number of slots (or teeth which at least partly define those slots) that is the same as the number of stator slots (or teeth which at least partly define those slots). Each respective stator coil extends through a respective one of the slots of the heat exchanger, between two respective neighboring teeth of the heat exchanger, such that the heat exchanger encircles, or substantially (or largely) surrounds, the stator coils. Also, each respective stator coil also extends within corresponding slots of the stator core portions between which the heat exchanger is positioned. Also, in other embodiments, the number of stator slots and the number of heat exchanger slots need not be the same. For example, in some such embodiments, the number of stator slots can be double the number of heat exchanger slots. Such a difference in the numbers of slots can be desirable for various reason (e.g., some of the slots may be skipped to reduce a pressure drop).

In at least some such embodiments, the heat exchanger additionally includes internal passageways formed by internal walls of the heat exchanger, including routers that extend radially inwardly within at least some of the teeth (in between neighboring slots) of the heat exchanger. By virtue of the internal passageways, coolant pumped into the heat exchanger at one or more inlets (by one or more pumps) not only flows in a generally circumferential direction within the heat exchanger from the one or more inlets to one or more outlets of the heat exchanger, but also flows radially inwardly and radially outwardly within one or more of the teeth of heat exchanger. Due to this flow pattern, the coolant passes alongside corresponding ones of the stator coils that are positioned on opposite sides of the respective teeth (within respective slots on opposite sides of the respective teeth), thus serving to cool the stator coils. Additionally, given this arrangement, there not only is direct contact between the heat exchanger and the stator coils of the electric machine positioned within the slots of the heat exchanger, but also direct contact between the heat exchanger and the stator laminations of the stator core portions between which the heat exchanger is situated, which allows for enhanced cooling and thermal performance of the electric machine. Because there is direct contact between the heat exchanger and the stator coils and core, effective cooling of the stator coils and core can be achieved without degradation in the slot fill factor.

In addition to such example embodiments, the present disclosure also encompasses numerous other embodiments as well. For example, the present disclosure also encompasses embodiments of stator packages that have multiple heat exchangers. Such embodiments can further include, for example, embodiments in which the multiple heat exchangers have inlets and outlets that are circumferentially aligned or offset from one another in terms of the relative positioning or configuration of different ones of the inlets and outlets of the different heat exchangers, and/or embodiments in which the coolant flows in various directions in the different heat exchangers. Also, for example, the present disclosure encompasses embodiments in which there are more than one inlet and/or more than one outlet associated with a given heat exchanger, as well as embodiments having different arrangements of stator coils than stator coils which are situated within slots of a stator core. The present disclosure is also intended to encompass any of a variety of embodiments in which a stator package or stator includes at least one heat exchanger, and/or any of a variety of different features of the electric machine and/or stator package thereof take different forms. For example, the materials used for the heat exchanger, manufacturing method of the heat exchanger, the types of coolant that are employed, the arrangements or orientations of the inlets and/or outlets, and the number or types of pumps that are employed to pump coolant, can vary depending on the embodiment, application needs, or operational circumstances.

Referring now to FIG. 1, a schematic front elevation view is provided of a first electric machine 100, in accordance with an example embodiment encompassed herein. As shown, the electric machine 100 includes a first stator package 102, a rotor (or rotor assembly) 104, a motor control circuit 106, and a coolant pumping circuit 108. The rotor 104 is supported upon a rotor shaft 110. Both the rotor shaft 110 and the rotor 104 are concentric about, and rotate about a central axis 112. The stator package 102, which can also be referred to simply as a stator, is annular in shape and concentrically extends around the rotor 104 and the central axis 112. An annular air gap 114 extends between the rotor 104 and the stator package 102. It should be appreciated that the view of the electric machine 100 is considered, for purposes of the present description, to be a front elevation view, with the viewing axis being along the central axis 112 (as viewed toward the page). Also, the view of the electric machine 100 is considered to be a schematic view insofar as details of the electric machine, such as wiring arrangements within the electric machine, are omitted to facilitate understanding.

In the present example embodiment, the electric machine 100 can be a permanent magnet motor in which the rotor 104 includes permanent magnets but the stator package 102 includes electromagnets created by stator coils excitation. In other embodiments, the electric machine 100 can take other forms, including forms in which the rotor 104 does not have permanent magnets, such as a wound rotor, squirrel-cage rotor, or reluctance rotor. Operation of the electric machine 100 is achieved by controlling actuation of the electromagnets, provided by stator coils (see FIG. 2) of the stator package 102, in accordance with control signals generated by the motor control circuit 106. The motor control circuit 106 can take any variety of forms depending on the embodiment. For example, the motor control circuit 106 can include a motor drive 116 that includes both a motor controller and inverter circuits, where the inverter circuits of the motor drive 116 are coupled to the stator package 102 by way of one or more wiring connections 118. In such an embodiment, the motor controller, which can for example take the form of a microprocessor, can control actuation of the inverters (e.g., by providing pulse with modulation signals to the inverters) so that the inverters in turn apply alternating current (AC) signals to the stator coils of the stator package 102. Also, notwithstanding the embodiment shown in FIG. 1, the present disclosure also encompasses other embodiments of electric machines having other types of drive schemes. For example, in some such embodiments, the electric machine can take the form of a motor that is directly connected to the electric power grid (e.g., without the motor control circuit 106, motor drive 116, and wiring connections 118 shown in FIG. 1).

As for the coolant pumping circuit 108, in the present embodiment that circuit extends between an inlet 120 and an outlet 122 of the stator package 102. More particularly, the coolant pumping circuit 108 includes a first hose linkage 124 coupling the inlet 120 with a pump 126, a second hose linkage 128 coupling the pump 126 to a coolant reservoir 130, and a third hose linkage 132 linking the outlet 122 with the reservoir 130. Given this arrangement, coolant exiting the outlet 122 passes to the reservoir 130, and then can be pumped back to the inlet 120 by way of the pump 126. Depending upon the embodiment, the coolant can take the form of water, glycol (or a combination of water and glycol), oil, or any of a variety of other thermally-conductive liquids. Although the coolant pumping circuit 108 of FIG. 1 is illustrating as having a single pump, single coolant reservoir, and only three hose linkages connecting those components to the inlet 120, outlet 122, and to one another, the present disclosure is also intended to encompass other embodiments in which the coolant pumping circuit takes other forms, has additional components, and/or is coupled to more than one inlet and/or more than one outlet.

Figure 2:
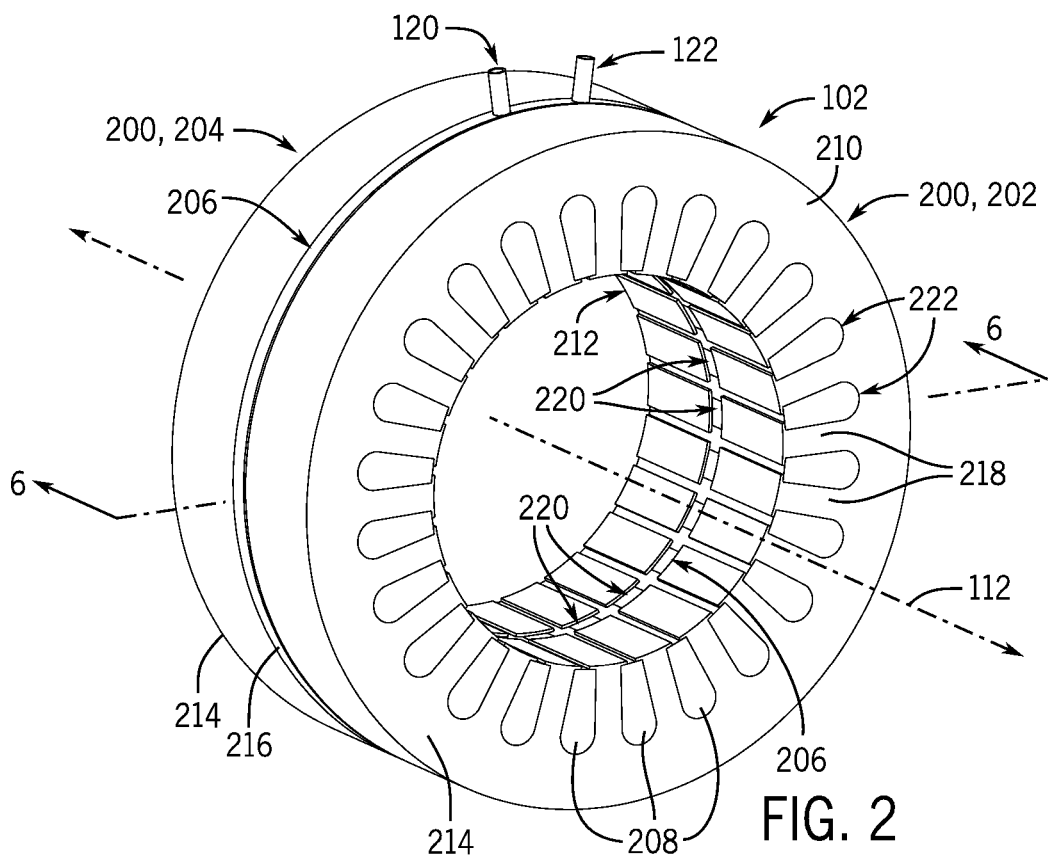
FIG. 2 is a schematic front perspective view of the first stator package of FIG. 1, including a first heat exchanger, in accordance with the first example embodiment.

Turning to FIG. 2, a schematic front perspective view of the stator package 102 is provided to illustrate components and features of the stator package in more detail. As shown, the stator package 102 includes a stator core 200 that includes a first (or front) stator core portion 202 and a second (or rear) stator core portion 204. Each of the first and second stator core portions 202 and 204 can also be (or be referred to as) a respective stator sub-stack or group of laminations (e.g., a group of steel sheets stacked together). Additionally, the stator package 102 includes a first heat exchanger 206 that includes the inlet 120 and outlet 122, each of which extends radially outward in the present embodiment (although the inlet and/or outlet can extend in other directions/angles depending upon the embodiment). Further in the present embodiment, each of the first and second portions 202 and 204 of the stator core 200 and the heat exchanger 206 is substantially annular and extends around the central axis 112. The heat exchanger 206 is sandwiched or positioned between the first and second portions 202 and 204 of the stator core 200, so as to be in direct contact with each of (behind and in front of, or on opposite sides of, the heat exchanger) the first and second portions of the stator core. In the present embodiment the first and second stator core portions 202 and 204 can be considered to be structurally identical, although this need not be the case in all embodiments (for example, in another embodiment, one stator core portion can be longer or shorter than the others).

Although each of the first and second stator core portions 202 and 204 and the heat exchanger 206 is substantially annular, in the present embodiment each of those structures is configured to accommodate a plurality of stator coils or windings 208, which in the present example embodiment includes twenty-four (24) stator coils (albeit any number of one or more stator coils can be present depending upon the embodiment). To accommodate the stator coils 208, each of the respective first and second stator core portions 202 and 204 has a respective outer annular portion or yoke 214, and likewise the heat exchanger 206 has an outer annular portion or yoke 216. Further, each of the first and second stator core portions 202 and 204 has a respective plurality of radially inwardly extending teeth 218 distributed circumferentially around those stator core portions, and likewise the heat exchanger 206 has a plurality of radially inwardly extending teeth 220 distributed circumferentially around that heat exchanger. Also with respect to the first and second stator core portions 202 and 204, respective neighboring pairs of the respective teeth 218 and respective portions of the yoke 214 (linking those respective neighboring pairs of the teeth) respectively form respective slots 222. Likewise, respective neighboring pairs of the respective teeth 220 and respective portions of the yoke 216 (linking the respective neighboring pairs) respectively form respective slots 224 of the heat exchanger 206 (see FIG. 3, as discussed below).

In the present arrangement, the respective slots 222 of the first and second stator core portions 202 and 204 are fully aligned with the respective slots 224 of the heat exchanger 206. Thus, each of the respective stator coils 208 can be positioned as to extend all of the way from a front surface 210 of the first stator core portion 202, through that first portion to the heat exchanger 206, then through the heat exchanger 206 to the second stator core portion 204, and further through the second stator core portion to a rear surface 212 of the second stator core portion. Accordingly, each of the stator coils 208 extends axially the full length of the stator package 102, from the front surface 210 of the first stator core portion 202, through that stator core portion, the heat exchanger 206, and the second stator core portion 204, up to the rear surface 212 of that second stator core portion. However, in alternate embodiments, one or more of the stator coils can extend different lengths so as to be shorter or longer than the full length of the stator package 102. Further, in at least some other embodiments, the stator coils do not necessarily extend exactly axially, parallel to a central axis such as the central axis 112. For example, in some other embodiments, the stator coils extend generally or substantially parallel to or along the central axis, or only partly parallel to or along the central axis. Further for example, in some such embodiments, there may be skewing in stator coils. With such skewing, the stator coils can extend in manners that include components that extend along the central axis, but also components that extend in other directions, such as circumferentially (e.g., such that the stator coils can be helical) or radially. It will be appreciated further that, in one such example embodiment in which there is skewing in the circumferential direction, the respective slots of the first and second stator core portions (e.g., the slots corresponding to the slots 222 of the stator core portions 202 and 204) and respective slots of the heat exchanger (e.g., the slots corresponding to the slots 224 of heat exchanger 206) do not align due to such skewing.

Figure 3:
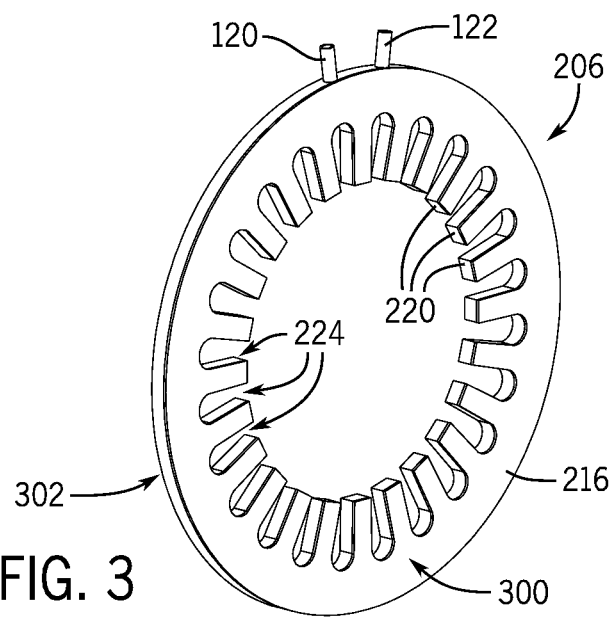
FIG. 3 is a schematic front perspective view of the first heat exchanger of the first stator package of FIGS. 1 and 2, shown apart from other portions of the first stator package.

Referring next to FIG. 3, a schematic front prospective view is provided of the first heat exchanger 206 independent of the first and second stator core portions 202 and 204 of the stator core 200. FIG. 3 particularly shows not only the inlet 120 and outlet 122 of the heat exchanger 206, but also the yoke 216 and teeth 220 of the heat exchanger 206, as well as the slots 224 formed between neighboring pairs of those teeth. In the present embodiment, the heat exchanger 206 is formed from the combination of a cover (or cover portion) 300 and a base (or base portion) 302. In the present embodiment, the cover 300 and base 302 are structures that are additively manufactured (or manufactured by way of 3D printing) and then assembled together. Alternatively, the heat exchanger can also be printed as a single part (e.g., with the base and cover integrally formed or merged together) so as to appear as shown in FIG. 3, using additive manufacturing-indeed, manufacturing the heat exchanger as a single part may be desirable to achieve better sealing and reduced complexity. Additionally, conventional subtractive manufacturing methods, such as computer numerical control (CNC) milling, can also be used in the manufacturing stage. Further, in the present embodiment the cover 300 and base 302 can be manufactured from aluminum although, in other embodiments, other materials can also be used. It should be appreciated that the performance of the heat exchanger 206 increases as the thermal conductivity of the used material increases.

Figure 4:
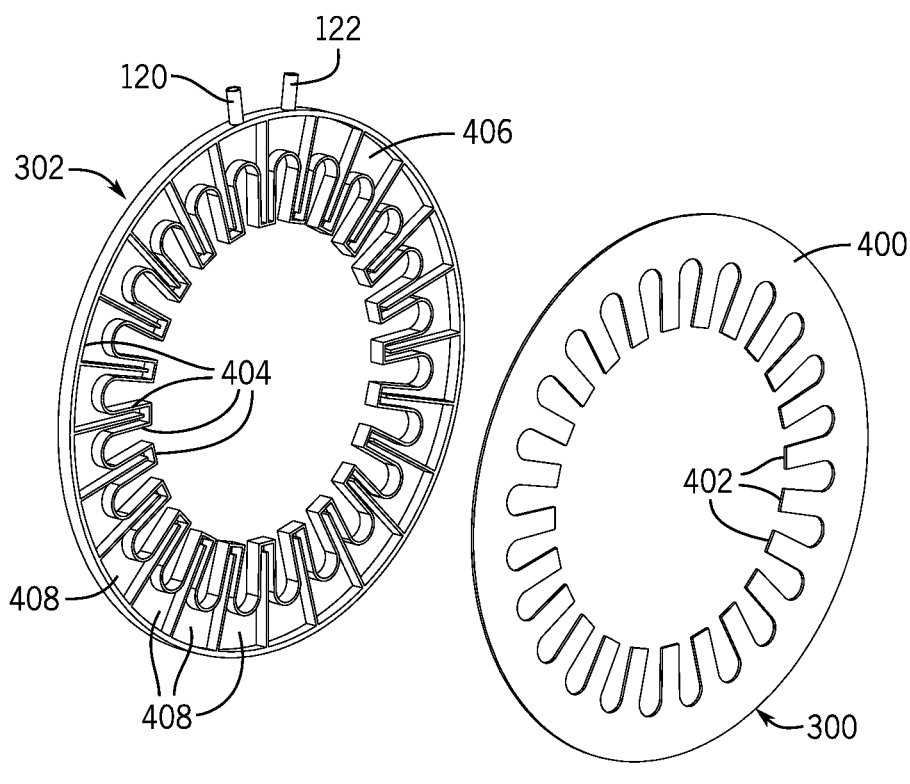
FIG. 4 is a schematic front perspective, exploded view of base and cover portions of the first heat exchanger of FIG. 3.

Further in this regard, FIG. 4 shows an exploded view of the heat exchanger 206 in which the cover 300 is separated from the base 302. As is evident from FIG. 4, in the present embodiment the cover 300 is a flat disc having an outer annular yoke region 400 and radially inwardly extending tooth regions 402. In contrast, the base 302 has a more complicated structure. Not only does the base 302 include the inlet 120 and the outlet 122, but also the base 302 includes a plurality of axially-extending walls 404. The axially-extending walls 404, in combination with a rear wall 406 of the base 302 (which is the structural portion of the heat exchanger 206 that is positioned adjacent to the second stator core portion 204 shown in FIG. 2) and the cover 300 (which also serves as a wall), define a plurality of undulating interior channels or passageways 408 within the heat exchanger 206 that extend generally circumferentially around the heat exchanger from the inlet 120 to the outlet 122, as described in further detail with respect to FIG. 6 below.

Figure 5:
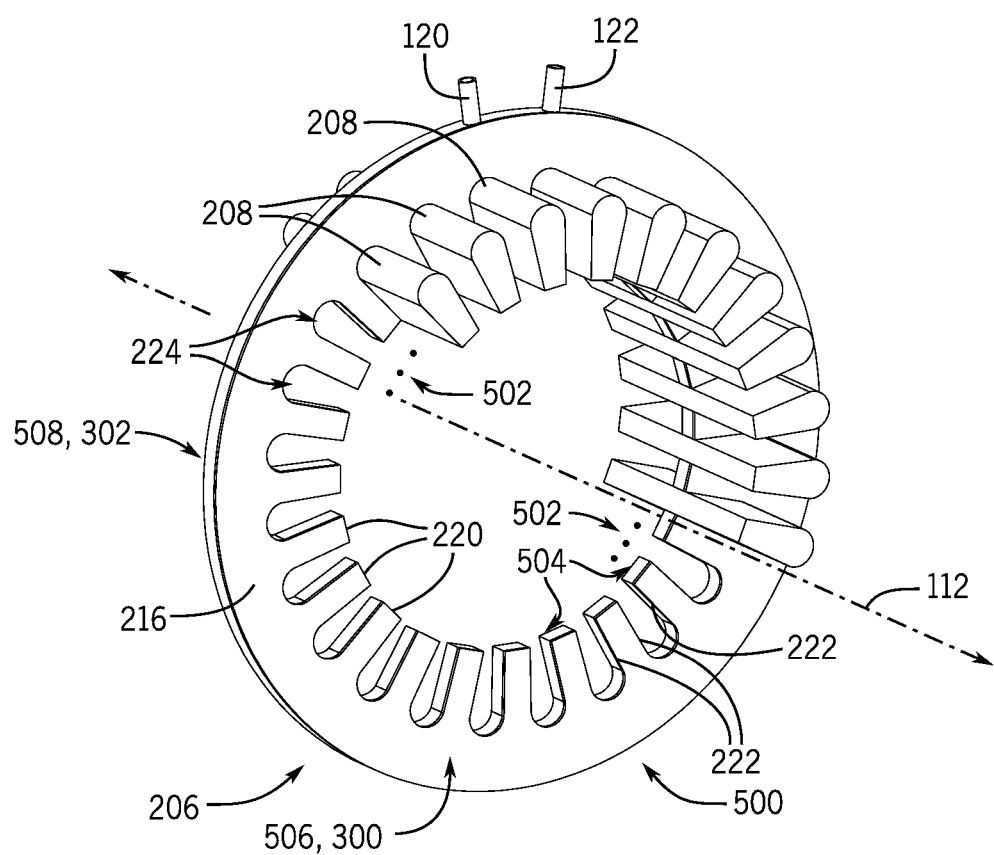
FIG. 5 is a schematic front perspective view of the heat exchanger of FIGS. 2, 3, and 4 in combination with several stator coils of the first stator package of FIG. 2 in relation to which the heat exchanger is assembled (with other portions of the stator package removed), so as to reveal in more detail how the stator coils are positioned within slots of the heat exchanger.

Referring additionally to FIG. 5, a schematic front perspective view is provided of a combination of 500 of both the heat exchanger 206 and several of the stator coils 208, to particularly illustrate the relative positioning of the stator coils in relation to the slots 224 of the heat exchanger 206. As indicated by dots (ellipses) 502, only some of the stator coils 208 of the stator package 102 are illustrated in FIG. 5, so as to allow for a clearer illustration of the relative positioning of the stator coils 208 in relation to the heat exchanger 206. In particular, FIG. 5 illustrates how the stator coils 208 in the present embodiment respectively extend, within the respective slots 224 (between respective neighboring pairs of the teeth 220) of the heat exchanger 206, radially outwardly from an inner rim 504 of the heat exchanger (radially outward from tips of the teeth 220 of the heat exchanger) to the yoke 216 of the heat exchanger 206. Further, FIG. 5 also shows how the stator coils 208 respectively extend axially forward and rearward of the heat exchanger 206 in a manner parallel or substantially parallel to the central axis 112. More particularly, each of the stator coils 208 extends forward of a front surface 506 of the cover 300 as well as rearward of a rear surface 508, behind the base 302. In this manner, the stator coils 208 not only extend within the slots 226 of the heat exchanger 206 but also extend beyond the heat exchanger such that the stator coils 208 will be positioned within the slots 222 of the first and second stator core portions 202 and 204 when those portions are present.

Figure 6:
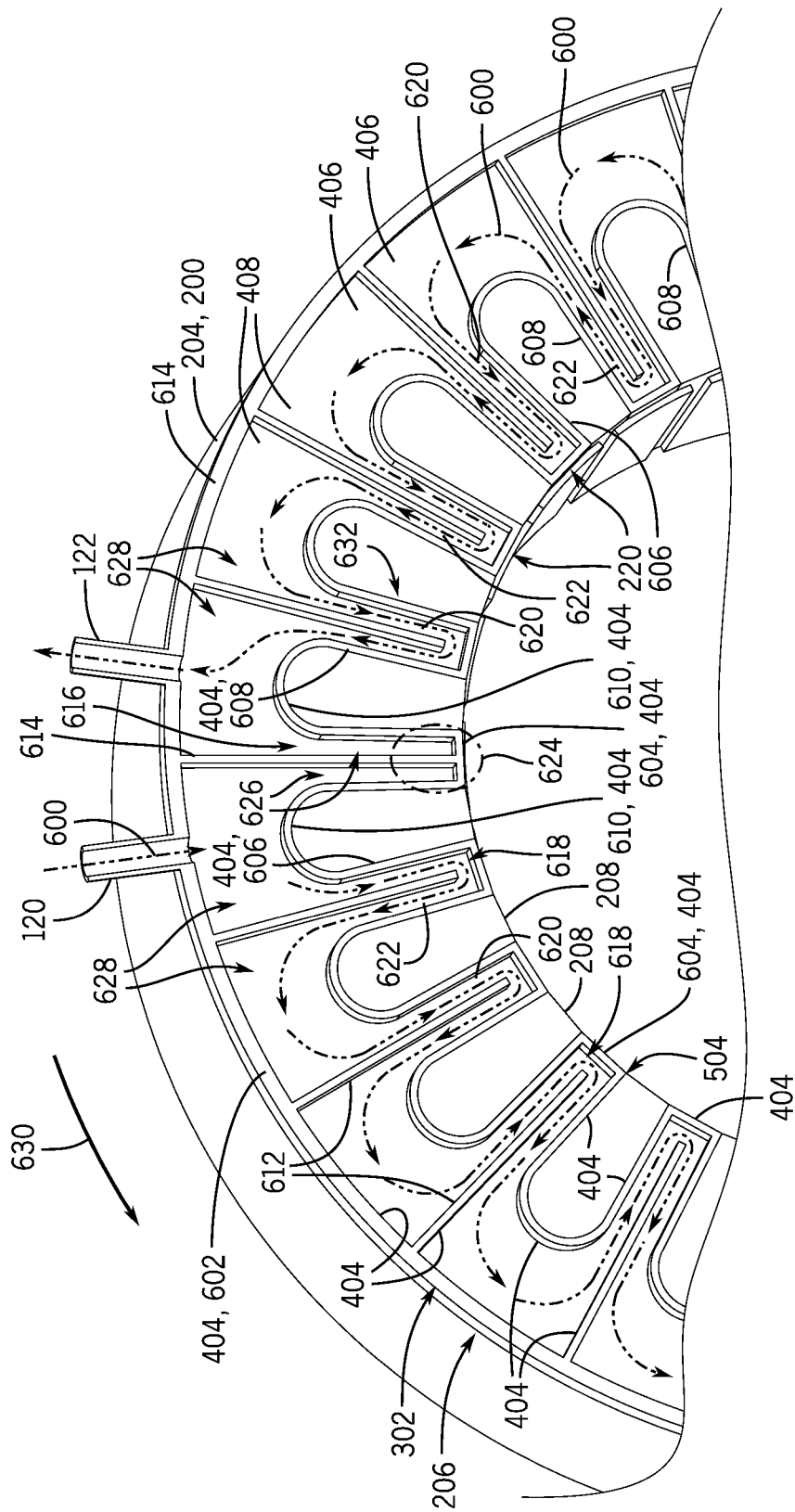
FIG. 6 is a cutaway, cross-sectional and perspective view of the first stator package of FIG. 2 and the heat exchanger thereof, taken along a line 6-6 of FIG. 2, which also schematically illustrates example coolant flow through the heat exchanger during operation.

Turning next to FIG. 6, a further cut away, cross-sectional and perspective view of the stator package 102 of FIG. 2 is provided. The cross-sectional view of the stator package 102 shown in FIG. 6 more particularly is one taken along a line 6-6 of FIG. 2, which defines a cross-sectional plane cutting through the heat exchanger 206 along a mid-plane of the base 302 (as described with respect to FIGS. 3, 4, and 5), in a manner perpendicular to the central axis 112. Given this particular cross-sectional view, FIG. 6 particularly shows in further detail the base 302 and particularly the axially-extending walls 404 and passageways 408 formed within the base (along with the rear wall 406 of the base). Further, FIG. 6 figuratively illustrates example a flow path or trajectory 600 that is followed by coolant flowing through the passageways 408 as directed by the walls 404 in combination with the rear wall 406 and cover 300, due to interactions between the coolant and those walls. The flow path 600, which is represented by dashed line(s) with arrowheads indicating flow directions, can also be understood to represent the coolant flowing through the passageways 408. Additionally, FIG. 6 also shows several of the stator coils 208 positioned within corresponding ones of the slots 224 of the heat exchanger 206, as well as the second stator core portion 204 positioned adjacent to and behind the rear wall 406 of the base 302.

Further as illustrated in FIG. 6, the plurality of walls 404 include an outer rim wall 602 that circumferentially extends around the yoke 216, and respective inner end walls 604 of the respective teeth 220, which form portions of the inner rim 504. Additionally, the plurality of walls 404 also include respective first and second side walls 606 and 608 of each of the teeth 220, and respective linking walls 610. Given the particular orientation of the view provided in FIG. 6, the respective first side walls 606 form the respective clockwise side edges of the respective teeth 220, and the respective second side walls 608 form the respective counterclockwise side edges of the respective teeth. The respective inner end walls 604 couple the respective first and second side walls 606 and 608 of the respective teeth 220 along the inner rim 504, and the respective linking walls 610 respectively connect the respective first side walls 606 of the respective teeth 220 of the heat exchanger with the respective second side walls 608 of respective neighboring ones of the teeth. The respective linking walls 610 can be considered inner boundary walls of the yoke 216. In the present embodiment, the linking walls 610 are curved such that the respective linking walls and the respective first and second side walls 606 and 608 to which the respective linking walls are connected effectively form continuous curved walls that (together with the inner rim 504) define the circumferential and radial boundaries of the slots 224 of the heat exchanger 206 within which the respective stator coils 208 are positioned.

In addition, to form the passageways 408, the heat exchanger 206 (and base 302 thereof) also includes a plurality of router walls (or simply routers) 612 and a barrier wall 614. Each of the routers 612 and barrier wall 614 is a respective generally radially inwardly extending wall that is circumferentially aligned with a respective midline of a respective one of the teeth 220 and that particularly extends radially inwardly from the outer rim wall 602 toward the respective inner end wall 604 of that respective tooth (and also generally extends toward the central axis 112, shown in FIG. 2). In the present embodiment, respective ones of the routers 612 are positioned so as to extend within each of the teeth 220 except that, with respect to a first tooth 616 (one of the teeth 220) that is positioned between the inlet 120 and outlet 122, the barrier wall 614 is provided so as to extend within that tooth. Although in the present embodiment the routers 612 and barrier wall 614 are shown to extend generally radially inwardly, it should further be appreciated that in other embodiments these wall structures need not extend exactly radially inwardly and/or need not extend in straight directions. For example, in some alternate embodiments, one or more of the routers and barrier wall can extend in manners that are angularly offset or skewed relative to radial directions, and/or take on various curvatures (which can be desirable in some embodiments, for example, to increase turbulence and increase cooling performance).

Additionally as shown, each of the routers 612 extends radially inwardly from the outer rim wall 602 toward, but not all of the way to, the respective inner end wall 604 of the respective tooth 220 within which the respective router extends. Rather than extending all of the way to the respective inner end walls 604, the respective routers 612 end prior to reaching those respective inner end walls so that respective gaps 618 are present between the respective routers and the respective inner end walls. Due to the gaps 618, respective first and second side channels 620 and 622 that are formed between the respective routers 612 and the respective first and second side walls 606 and 608 of each of the teeth 220 are coupled with one another proximate the respective inner end walls 604 of those teeth. In contrast, the barrier wall 614 does extend radially inwardly from the outer rim wall 602 all of the way inwardly to the respective inner end wall 604 of the first tooth 616. Consequently, no gap corresponding to the gaps 618 exists within the first tooth 616 but instead an inner most tip of that tooth constitutes a barrier region 624. Correspondingly, two additional side channels 626 that are respectively formed between the first and second side walls 606 and 608, respectively, of the first tooth 616 and the barrier wall 614 are isolated from one another.

It will be further appreciated from FIG. 6 that the passageways 408 within the heat exchanger 206 not only include the side channels 620, 622 and the gaps 618 within the teeth 220 (other than the first tooth 616), but also include yoke channels 628 that are spaces within the yoke 216 in between successive ones of the routers or between the routers 612 and the barrier wall 614. The yoke channels 628 serve to couple the respective second side channels 622 and respective first side channels 620 of neighboring pairs of the teeth 220 with respect to which the respective teeth of the respective pair are respectively coupled by the respective linking walls 610, except for either of the two neighboring pairs of the teeth that include the first tooth 616. Further, with respect to those two neighboring pairs of the teeth 220 that include the first tooth 616, the yoke channels 628 serve to couple the inlet 120 with the first side channel 620 of the tooth 220 immediately next to that inlet as one proceeds circumferentially in a direction indicated by an arrow 630 (in this example, a counterclockwise direction), and also to couple the outlet 122 with the second side channel 622 of the tooth 220 immediately next to that outlet as one proceeds in a direction opposite that of the arrow 630.

Given this arrangement of the walls 404 (in combination with the cover 300 and the rear wall 406 of the base 302) and passageways 408 established by the walls, the coolant pumped into the heat exchanger at the inlet 120 will flow by way of the passageways 408 from the inlet 120 to the outlet 122 in a manner corresponding to the flow path 600. More particularly, upon the coolant entering the inlet 120, the coolant proceeds by way of a first one of the yoke channels 628 circumferentially in the direction of the arrow 630 to the first side channel 620 of that one of the teeth 220 that is immediately next to that inlet (in this example, the next tooth immediately counterclockwise of the first tooth 616). The coolant then proceeds to flow radially inwardly through the respective first side channel 620, through the gap 618, and radially outwardly through the second side channel 622 of that one of the teeth 220. Next, the coolant proceeds to flow from that second side channel 622 of that tooth 220 to the respective first side channel 620 of the neighboring tooth (the next successive one of the teeth in the direction of the arrow 630) by way of a respective one of the yoke channels 628. This process of the coolant flowing through respective ones of the teeth 220 and then proceeding to neighboring ones of the teeth is repeated until a final one 632 of the teeth 220 is reached, just prior to the first tooth 616 (in this example immediately clockwise of the first tooth 616). Upon reaching the final one 632 of the teeth 220, the coolant proceeds to flow radially inwardly through the respective first side channel 620, through the gap 618, and radially outwardly through the second side channel 622 of that tooth and then further proceeds to flow to the outlet 122 by way of a final one of the yoke channels 628, at which point the coolant exits the heat exchanger.

In this manner, therefore, coolant entering the inlet 120 of the heat exchanger 206 follows an undulating (or S-shaped) route around the heat exchanger in a circumferential direction indicated by the arrow 630 (in this example, a counterclockwise direction) until the coolant exits at the outlet 122. Particularly due to the undulating route that is followed, the coolant passes closely alongside each of the slots 224 and the stator coils 208 positioned therewithin. Further, except with respect to those two of the slots 224 that are adjacent to the first tooth 616, the coolant passes alongside each of the slots 224 (and stator coils 208 therewithin) on three sides, namely, the sides corresponding to the first side walls 606, second side walls 608, and linking walls 610. This undulating flow path maximizes the convective heat transfer coefficient between stator coils 208 and heat exchanger 206 because the coolant encircles the slots 224 and stator coils. Also, due to the presence of the barrier wall 614, no coolant can flow directly between the inlet 120 and outlet 122 without flowing circumferentially around the heat exchanger 206. Thus, with this arrangement of the walls 404 and passageways 408 of the heat exchanger 206, coolant within the heat exchanger flows generally circumferentially in the direction of the arrow 630 and, as it does so, the coolant generally flows both radially and circumferentially alongside the stator coils 208 positioned in the slots 224 between neighboring ones of the teeth 220. As the coolant proceeds between the inlet 120 and outlet 122 is the manner, the coolant is heated and changed from being cold or cool at the inlet 120 to being hot or warm at the outlet 122.

Turning now to FIG. 7, FIG. 8, FIG. 9, and FIG. 10, schematic front perspective views of second, third, fourth, and fifth stator packages 700, 800, 900, and 1000, respectively, are shown. The second, third, fourth, and fifth stator packages 700, 800, 900, and 1000 are further example embodiments of stator packages encompassed herein, and can additionally for example can be implemented in the electric machine 100 of FIG. 1 in place of the first stator package 102 or in other electric machines. In contrast to the first stator package 102 described above, each of the second, third, fourth, and fifth stator packages 700, 800, 900, and 1000 includes more than one heat exchanger and more than two stator core portions.

Figure 7:
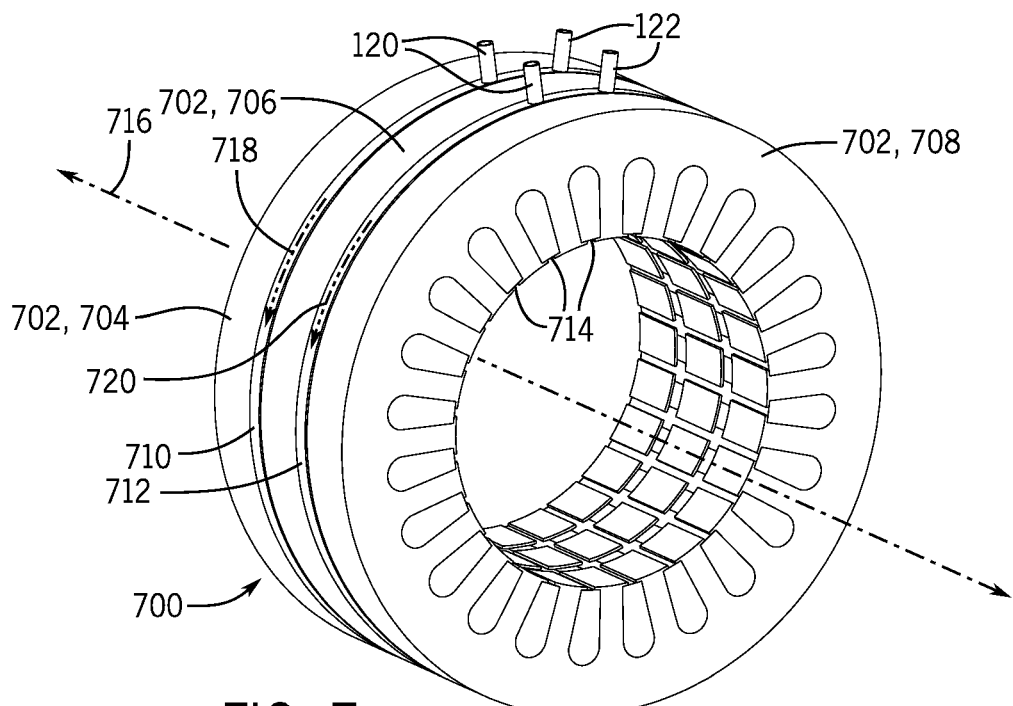
FIGS. 7, 8, 9, and 10 respectively are schematic front perspective views of second, third, fourth, and fifth stator packages, respectively, which differ from the first stator package of FIG. 2, in accordance with second, third, fourth, and fifth example embodiments encompassed herein.

With respect to the second stator package 700 of FIG. 7, it can be seen that this stator package includes a stator core 702 that includes each of a first stator core portion 704, a second stator core portion 706, and a third stator core portion 708. Additionally, the second stator package 700 includes a first heat exchanger 710 and a second heat exchanger 712, as well as stator coils 714. Each of the first and second heat exchangers 710 and 712 includes a respective inlet 120 and a respective outlet 122. It should be appreciated that each of the first and second heat exchangers 710 and 712 can be identical to one another and also identical to the heat exchanger 206 of the first stator package 102. Also, it should be appreciated that each of the first, second, and third stator core portions 704, 706, and 708 can be identical to each other as well as identical to each of the first and second stator core portions 202 and 204 of the first stator package 102. However, in alternate embodiments, the first and second heat exchangers 710 and 712 can be different from one another and/or two or more of the first, second, and third stator core portions 704, 706 and 708 can be different from one another. For example, in one such alternate embodiment, the second stator core portion 706 can be thicker in the axial direction by comparison with the first and third stator core portions 704 and 708 because the second stator core portion is cooled by both of the first and second heat exchangers 710 and 712.

In contrast to the first stator package 102, the second stator package 700 can be considered a "double-decker" stator package insofar as the stator package includes both of the heat exchangers 710 and 712 that are respectively positioned between respective pairs of the stator core portions 704, 706, and 708. More particularly in this regard, the first heat exchanger 710 is positioned between the first stator core portion 704 and the second stator core portion 706, the second stator core portion 706 is positioned between the first heat exchanger 710 and the second heat exchanger 712, and the second heat exchanger 712 is positioned between the second stator core portion 706 and the third stator core portion 708. As with the first and second stator core portions 202 and 204 and heat exchanger 206 of the first stator package 102, each of the first, second, and third stator core portions 704, 706, and 708 and first and second heat exchangers 710 and 712 of the second stator package 700 is substantially annular and is arranged about a central axis 716. Also, each of the stator core portions 704, 706, and 708 and heat exchangers 710 and 712 includes respective slots formed by respective teeth of those structures, within which are positioned the stator coils 714. Although the stator coils 714 and corresponding slots in the second stator package 700 can be identical in cross-sectional shape to those of the first stator package 102, it will be appreciated that the stator coils 714 are axially longer than the stator coils 208 of the first stator package 102 insofar as the second stator package 700 includes three stator core portions (rather than two) and two heat exchangers (rather than one). However, it should also be appreciated that the stator coils 714 need not be axially longer than the stator coils 208 depending upon the embodiment. For example, if the stator core portions of the first stator package 102 have different axial lengths than the stator core portions of the second stator package 700, then the stator coils 714 can be axially shorter than (or have the same axial lengths as) the stator coils 208 of the first stator package 102.

In the second stator package 700 of FIG. 7, each of the first and second heat exchangers 710 and 712 is arranged in the same orientation as described earlier with respect to the first heat exchanger 206. Given such positioning of the respective inlets 120 and outlets 122 of the respective heat exchangers 710 and 712, coolant tends to flow in a counterclockwise direction both within the first heat exchanger as indicated by a first dashed arrow 718 and also within the second heat exchanger as indicated by a second dashed arrow 720 (counterclockwise given the view that is shown in FIG. 7). In contrast, with respect to the third stator package 800 of FIG. 8, the respective heat exchangers of that stator package are aligned in the opposite orientation so as to result in different directions of circumferential flow for two different heat exchangers.

Figure 8:
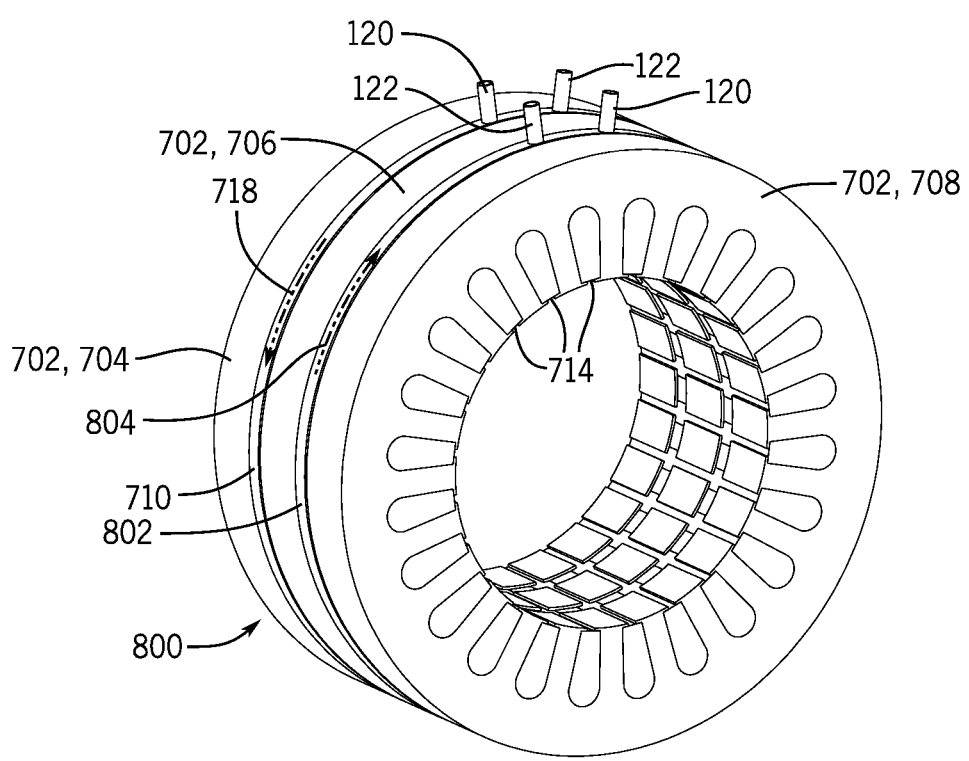

More particularly in this regard, the third stator package 800 again includes the first, second, and third stator core portions 704, 706, and 708, and additionally includes two heat exchangers including the first heat exchanger 710 and a second heat exchanger 802. The second heat exchanger 802 can be understood to be identical to the second heat exchanger 712 of FIG. 7 except insofar as it is inverted in its position relative to the other components of the third stator package 800. That is, the second heat exchanger 802 in FIG. 8 is flipped 180° about a vertical axis perpendicular to the central axis 716 by comparison with the second heat exchanger 712 of FIG. 7. Consequently, in the third stator package 800, the inlet 120 of the second heat exchanger 802 is circumferentially aligned with the outlet 122 of the first heat exchanger 710, and the outlet 122 of the second heat exchanger 802 is circumferentially aligned with the inlet of the first heat exchanger 710. Given this arrangement (which again includes the same stator coils 714 as in FIG. 7), the coolant flowing through the first heat exchanger 710 again tends to circumferentially flows in the counterclockwise manner indicated by the dashed arrow 718, but the coolant flowing through the second heat exchanger 802 flows circumferentially in the opposite (clockwise) direction as indicated by a dashed arrow 804.

Figure 9:
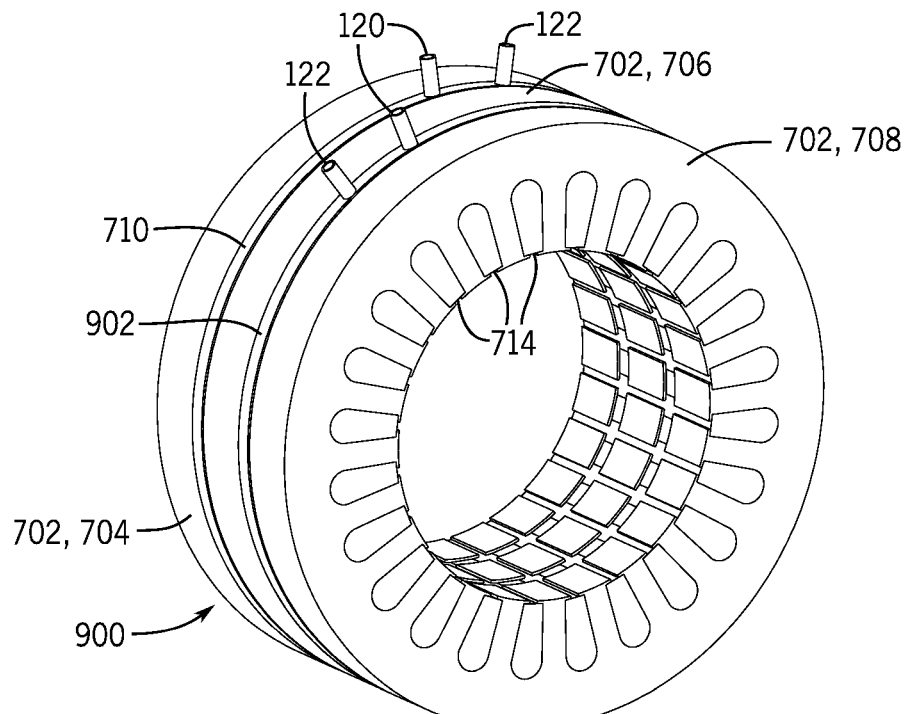

As for FIG. 9, the fourth stator package 900 shown therein is identical to the third stator package 800 except insofar as the fourth stator packages includes, in addition to the first heat exchanger 710, a second heat exchanger 902 rather than the second heat exchanger 802. In this embodiment, the second heat exchanger 902 is identical to the second heat exchanger 802 except insofar as, relative to the position of the first heat exchanger 710, the second heat exchanger 902 is circumferentially offset (or shifted or rotated) by comparison with the circumferential position of the second heat exchanger 802 (in this example, shifted by two slot pitches circumferentially in the counterclockwise manner). More particularly, although the inlet 120 and outlet 122 of the second heat exchanger 802 are respectively circumferentially aligned with the outlet 122 and inlet 120 of the first heat exchanger 710 in the third stator package 800, the second heat exchanger 902 of the fourth stator package 900 is instead rotated circumferentially relative to the first heat exchanger 710 such that the inlet 120 of the second heat exchanger 902 is positioned slightly counterclockwise of the inlet of the first heat exchanger 710, and the outlet 122 of the second heat exchanger 902 is positioned even farther counterclockwise of the inlet of the first heat exchanger.

Notwithstanding the above description relating to the embodiments of FIGS. 7, 8, and 9, it should be appreciated that the flow directions of coolant within each heat exchanger in an embodiment having multiple heat exchangers, as well as the relative circumferential or rotational positions/orientations of the respective heat exchangers, are design parameters that can be adjusted according to the thermal constraints or in view of other operational considerations. Additionally, the number of the heat exchangers stacked in any given stator package can be a design parameter that is adjusted according to the thermal constraints or other operational considerations. It should be appreciated that, although in the examples of FIGS. 7, 8, and 9, two heat exchangers and three stator core portions are present, the present disclosure is intended to encompass any of a variety of embodiments in which any arbitrary numbers of one or more heat exchangers and/or one or more stator core portions are present.

Figure 10:
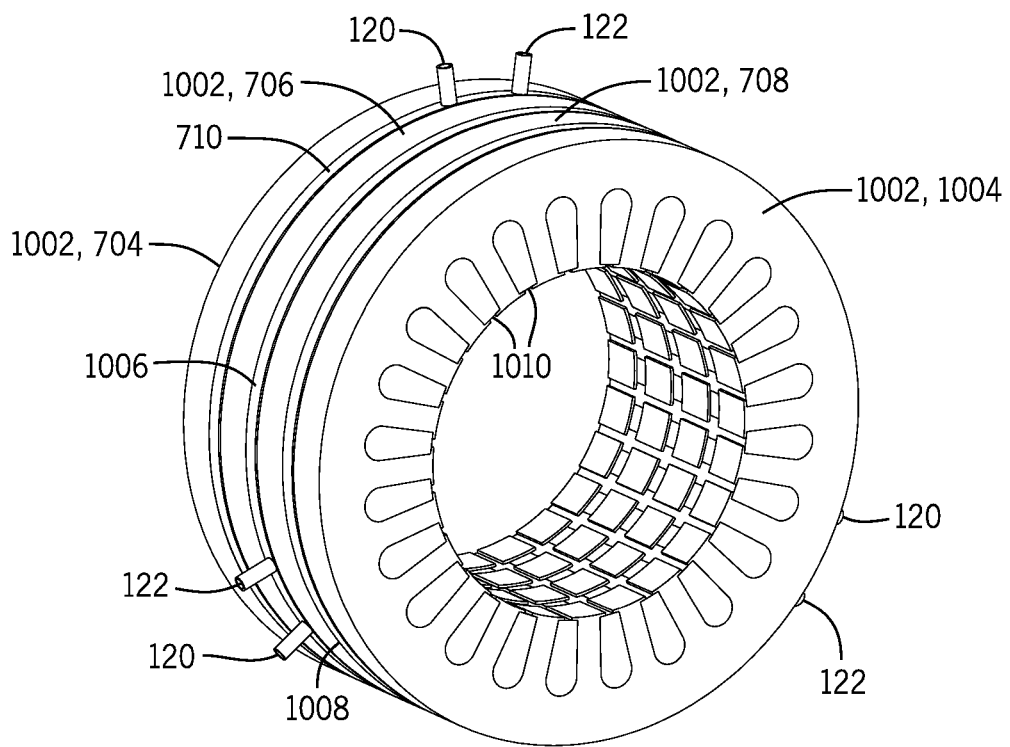

Further in this regard, with respect to FIG. 10, the fifth stator package 1000 is a "triple-decker" arrangement having three heat exchangers and four stator core portions. More particularly, the fifth stator package 1000 includes a stator core 1002 that not only includes the first, second, and third stator core portions 704, 706, and 708 described above in regard to the second, third, and fourth stator packages 700, 800, and 900, but also includes a fourth stator core portion 1004. Additionally, the fifth stator package 1000 not only includes the first heat exchanger 710 but also includes a second heat exchanger 1006 and a third heat exchanger 1008. Each of the stator core portions 704, 706, 708, and 1004 can be identical to one another in structure and also identical in structure to each of the stator core portions 202 and 204. Also, each of the heat exchangers 710, 1006, and 1008 can be identical in structure relative to one another and with respect to the heat exchangers 206 and 712 of the first and second stator packages 102 and 700, respectively. Notwithstanding the above discussion, however, it should also be appreciated that, in other embodiments, the first, second, third, and fourth stator core portions and first, second, and third heat exchangers of the stator package 1000 can take other forms. For example, the first, second, and third stator core portions can have different axial lengths than the first, second, and third stator core portions 704, 706, and 708 in the stator packages 700, 800, and 900.

It should be further appreciated from FIG. 10 that, in the present example embodiment, the second heat exchanger 1006 differs from the second heat exchanger 712 of the second stator package 700 insofar as the second heat exchanger 1006 is rotated counterclockwise by approximately 120° relative to the first heat exchanger 710. That is, the inlet 120 of the second heat exchanger 1006 is positioned approximately 120° relative to the inlet 120 of the first heat exchanger 710, and the outlet 122 of the second heat exchanger 1006 is rotated approximately 120° counterclockwise relative to the outlet 122 of the first heat exchanger 710. Further, the third heat exchanger 1008 also, although identical in structure to the first heat exchanger 710 and second heat exchanger 1006, is further rotated another 120° by comparison with the second heat exchanger 1006. As a result, the inlet 120 of the third heat exchanger 1008 is rotated counterclockwise approximately 240° relative to the inlet of the first exchanger 710 and the outlet 122 of the third heat exchanger 1008 is rotated counterclockwise approximately 240° relative to the outlet 122 of the first heat exchanger 710. Finally, the fifth stator package 1000 also includes stator coils 1010, which in this embodiment are identical in number and cross-sectional shape to the stator coils 208 and 714 shown in regard to the stator packages 102, 700, 800, and 900. However, the stator coils 1010 are longer axially than the stator coils 714 and 208 in the present embodiment insofar as the stator coils 1010 extend the full axial length of the stator package 1000 with its three heat exchangers and four stator core portions (albeit, in other embodiments, the stator coils 1010 can have axial lengths that are shorter than, or the same as, the axial lengths of the stator coils 714 or 208 depending upon the axial lengths of the stator core portions of the stator package).

The thermal performance of the stator packages having one or more heat exchangers, and/or electric machines employing such stator packages, can be assessed, evaluated, or predicted in any of a variety of manners, and the thermal performance characteristics of any given stator package can vary depending upon any of a variety of parameters. For example, such thermal performance can be evaluated by thermal simulation, as can be performed using computational fluid dynamics (CFD). Alternatively, to eliminate CFD analysis dependency and obtain quicker results, each stator package (or electrical machine) can be modeled using a lumped parameter thermal network (LPTN) as an analytical method.

Turning to FIGS. 11, 12, 13, 14, and 15, the schematic front perspective views of the first, second, third, fourth, and fifth stator packages 102, 700, 800, 900, and 1000, respectively, are shown again, in a manner intended to illustrate example temperature distributions within those respective stator packages that can occur during the same example operation of those stator packages (e.g. operation in conjunction with electric machines in which those stator packages are implemented). The temperature distributions illustrated in FIGS. 11, 12, 13, 14, and 15 are based upon one example thermal simulation. Based upon this thermal simulation, the range of temperatures that are present at different locations in the stator packages 102, 700, 800, 900, and 1000 is from 40° C. to 200° C. Nevertheless, it should be appreciated that the particular temperature range(s) in any given simulation can depend upon the embodiment being simulated, the type of simulation, and other assumptions underlying the simulation.

Several aspects of the temperature distributions experienced within the stator packages 102, 700, 800, 900, and 1000 shown in FIGS. 11, 12, 13, 14, and 15 are of particular note. First, it should be apparent from each of FIGS. 11, 12, 13, 14, and 15 that the coolest locations that are present in each of the embodiments are those locations along the respective heat exchanger or heat exchangers of the respective stator package that are at or closest to the respective inlets 120 for coolant within those respective heat exchangers. Thus, in FIG. 11 with respect to the first stator package 102, locations (or a region) 1100 near the inlet 120 of the heat exchanger 206 experience the coolest temperatures (at or around) 40°. Similarly, respective locations 1200 and locations 1202 in FIG. 2 along the first heat exchanger 710 and second heat exchanger 712, respectively, nearby the respective inlets 120 for those respective heat exchangers, experience the coolest temperatures.

Further, with respect to the third stator package 800, in which the coolant flows in a counterclockwise direction (assuming the particular view that is shown) within the first heat exchanger 710 but in a clockwise direction in the second heat exchanger 802, the coolest temperatures occur at locations 1300 within the first heat exchanger 710 at and immediately counterclockwise of the inlet 120 of that first heat exchanger, and also at locations 1302 within the second heat exchanger 802 at and immediately clockwise of the inlet 120 of that second heat exchanger 802. Additionally, with respect to the fourth stator package 900 of FIG. 14, the coolest temperatures occur at locations 1400 within the first heat exchanger 710 that are at and immediately nearby the inlet 120 of that first heat exchanger, as well as at locations 1402 within the second heat exchanger 902 that are at and immediately nearby the inlet 120 of that second heat exchanger 902. It should be noted that, although the coolest temperatures within the first heat exchanger 710 do occur at the locations 1400, due to the presence of the outlet 122 of the second heat exchanger 902 at a location counterclockwise of the inlet 120 of the first heat exchanger 710, there is a temperature gradient between the locations 1400 and additional locations 1404 within the first heat exchanger 710 that are counterclockwise of the locations 1400, such that the temperatures at the additional locations 1404 are higher than the temperatures at the locations 1400.

Further, with respect to the fifth stator package 1000, given that the respective inlets 120 of the first heat exchanger 710, second heat exchanger 1006, and third heat exchanger 1008 are respectively offset from one another by 120° increments, the coolest regions of that stator package occur within the respective heat exchangers at respective locations that are also offset by 120° increments. More particularly, it can be seen that the coolest region associated with the first heat exchanger 710 is at and immediately counterclockwise of the inlet 120 of that first heat exchanger at locations 1500, and that the coolest region associated with the second heat exchanger 1006 is at and counterclockwise of the inlet 120 of that second heat exchanger at locations 1502. Also, although the exterior surface of the third heat exchanger 1008 at the location of the inlet 120 of that third heat exchanger is obstructed from view, it can be seen that the coolest temperatures in that third heat exchanger occur at locations 1504 along several inner end walls of respective teeth, along the inner rim wall of that heat exchanger (e.g., corresponding to several of the inner end walls 604 of the respective teeth 220, along the inner rim 504, described in regard to FIG. 5), which are at and immediately counterclockwise of the inlet 120 of that third heat exchanger. Among other things, it should be appreciated from this illustration that the coolant entering a given heat exchanger at one of the inlets not only cools that heat exchanger at the exterior circumference near that inlet, but also cools the inner portions of that heat exchanger, even at or near the inner tips of the teeth of that heat exchanger, near that inlet.

Several other operational characteristics related to temperature distribution are also evident from FIGS. 11, 12, 13, 14, and 15. First, it should be appreciated that, as coolant flows around a given one of the heat exchangers in each of these embodiments, the coolant temperature and the temperature of the heat exchanger progressively becomes warmer as one moves from the respective inlet 120 of the respective heat exchanger toward the respective outlet 122 of the respective heat exchanger. In the regard, the respective inlets 120 and regions along the respective heat exchangers 206, 710, 712, 802, 902, 1006, and 1008 at and near those inlets 120 in each of these example embodiments has a temperature of around 40° C. (Celsius) and the temperature in each embodiment increases as one proceeds around the respective heat exchanger from the respective inlet 120 to respective outlet 122. Indeed, the temperature increases to such an extent that the respective outlets 122 associated with the respective heat exchangers 206, 710, 712, 802, 902, 1006, and 1008 (as well as regions proximate those outlets) have temperatures of approximately 80° C.

Also in this regard, it should be appreciated that there is a significant temperature gradient between the inlet 120 and outlet 122 in each of the heat exchangers 206, 710, 802, 902, 1006, and 1008 if one proceeds directly between the inlet and outlet (e.g., in a clockwise direction with respect to the first heat exchanger 206) rather proceeding all of the way around the respective heat exchanger. These temperature gradients exist because of the respective barrier walls (e.g., the barrier wall 614 described above) that are present within each of the heat exchangers 206, 710, 802, 902, 1006, and 1008. The barrier walls prevent coolant from flowing directly from the respective inlets 120 to the respective outlets 122 without first passing all the way around the respective heat exchanger, and result in turbulent flow at the inlet and outlets.

Further, it should be appreciated from FIGS. 11, 12, 13, 14, and 15 that each of the respective heat exchangers 206, 710, 712, 802, 902, 1006, and 1008 serves to cool the respective stator core portions that are immediately adjacent on either side of the respective heat exchanger. This is due to the heat exchangers being in direct contact with the adjacent stator core portions. Given this manner of cooling the respective stator core portions, each of the respective stator core portions generally exhibits increasing temperatures as one moves to locations within those stator core portions that are farther from any respective heat exchanger. For example with respect to the first stator package 102, as one proceeds axially forward or rearward from the locations 1100 within either the first stator core portion 202 or the second stator core portion 204, the temperatures generally increase from 40° C. at the regions 1100, to around 130° C. at midregions 1102, to around 160° C. at regions 1104 that are respectively farthest from (but circumferentially aligned with) the locations 1100.

Further, given that the temperature distributions around the respective stator core portions are influenced by the temperature variations within the heat exchangers with which those stator core portions are in direct contact, the temperature variations along the heat exchangers described above are also evident along the front faces of the respective stator package 102, 700, 800, 900, and 1000. For example, with respect to the first stator package 102 of FIG. 11, the temperature along a front face 1106 of the first stator core portion 202 varies from a low temperature of approximately 150° C. at locations 1108 that are circumferentially aligned with the locations 1100 (including with the inlet 120) of the first heat exchanger 206, to high temperatures of nearly 200° C. at locations 1110 that are circumferentially aligned with the outlet 122, especially at radially inward locations proximate the inner end walls of the teeth of that stator core portion (as well as the stator coils between those teeth).

In addition to the temperature distribution information illustrated in FIGS. 11, 12, 13, 14, and 15, Table 1 additionally is provided herein to illustrate further details concerning example thermal performance of the first, second, third, and fourth stator packages 102, 700, 800, and 900 of FIGS. 11, 12, 13, and 14 (or of electric motors cooled by such stator packages) according to one example thermal simulation. Table 1 identifies certain assumptions made for this example thermal simulation, regarding the axial length (in millimeters, mm) of each one of the respective stator package 102, 700, 800, and 900, the total flow rate (in Liters per minute, L/min.) of coolant through the heat exchanger(s) of the respective stator package, and the temperature-adjusted copper (Cu) loss (in kiloWatts, kW) experienced within the respective stator package. The copper loss for each design is calculated based upon the assumption that the current densities in the stator coils 208 or 714 within the respective stator packages 102, 700, 800, and 900 are the same. Also, it should be appreciated that, in this simulation, the total flow rate of coolant constitutes the total flow rate through the entire stator package. Thus, with respect to the first stator package 102 having the heat exchanger 206, the assumed coolant flow rate is the flow rate passing through that single heat exchanger but, with respect to the second, third, and fourth stator packages 700, 800, and 900, the assumed coolant flow rate is the total flow rate passing through both of the two heat exchangers simultaneously. Thus, for the stator packages 700, 800, and 900 that each have two heat exchangers, the coolant flow rate actually that actually passes through any given heat exchanger of those stator packages is one-half of the coolant flow rate for the stator package (e.g., 0.75 L/min per heat exchanger even though 1.5 L/min is listed for the stator package).

Based upon these assumptions, Table 1 lists the respective average temperature of the respective stator coils 208 or 714 within the respective stator package 102, 700, 800, and 900, the respective maximum temperature of those respective stator coils (hotspot temperatures), and the maximum core temperature within the respective stator package (all in degrees Celsius). Based upon the thermal performance determined via this example thermal simulation and shown in Table 1, it is evident that more homogenous temperature distributions with lesser hotspot temperatures can be observed if the stator packages employ multiple heat exchangers that have flow in reverse directions (e.g., as with the third and fourth heat exchangers 800 and 900) rather than in the same direction (e.g., as with the second heat exchanger 700). Indeed, the hotspot temperature for the third stator package 800 is 7° C. less than for the second stator package 700, and more homogenized temperature distribution is achieved for the third stator package by comparison with the second stator package. Further, it should be appreciated that the lowest hotspot temperature experienced among the stator packages 102, 700, 800, and 900 is achieved in the fourth stator package 900, which has a hotspot temperature that is 4° C. less than the third stator package 800 due to the two heat exchangers of the fourth stator package 900 being rotationally offset (in the circumferential direction) from one another (in addition to experiencing reversely-directed coolant flow).

TABLE 1

| Design | Axial length | Total flow rate | Temp.-adjusted Cu loss | Average coil temp. | Maximum coil temp. | Maximum core temp. |
|---|---|---|---|---|---|---|
| 1$^{st}$ Stator Package 102 | 108 mm | 1.5 L/min | 4.8 kW | 155° C. | 193° C. | 189° C. |
| 2$^{nd}$ Stator Package 700 | 114 mm | | 4.2 kW | 108° C. | 137° C. | 132° C. |
| 3$^{rd}$ Stator Package 800 | | | 4.2 kW | 108° C. | 130° C. | 128° C. |
| 4$^{th}$ Stator Package 900 | | | 4.2 kW | 109° C. | 126° C. | 122° C. |

Although not shown in Table 1, additional thermal simulation has also indicated that, by comparison with a conventional stator package (or motor) utilizing a housing jacket for cooling, the fourth stator package 900 can achieve significantly enhanced cooling performance. In particular, such additional thermal simulation has shown that, with a 14% increase in the axial length of the stator package/motor (that is, with the fourth stator package 900 having an axial length 14% greater than that of the conventional housing jacket design), the hotspot temperature on the stator coils and stator core can be decreased by approximately 100° C. compared to the housing jacket cooling case. Additionally, even the first stator package 102 can achieve significantly improved performance relative to the conventional housing jacket design. Indeed, according to the aforementioned thermal simulation (assuming anisotropic conductivities for the stator core and stator coils), a motor employing the first stator package 102 can achieve a hotspot temperature that is 32° C. less than the hotspot temperature of the aforementioned conventional housing jacket design. Thus, thermal simulation has demonstrated that the electrical loading of an electric machine can be increased significantly, by comparison with electric machines employing conventional housing jacket designs for cooling, by utilizing stator packages with heat exchanger(s) encompassed by the present disclosure (e.g., additively manufactured heat exchanger(s)).

In addition, thermal simulations have also demonstrated several other operational characteristics of stator packages such as the first, second, third, and fourth stator packages 102, 700, 800, and 900. In particular, additional thermal simulation has indicated that hotspot temperatures and average coil temperatures experienced within a given stator package will increase with current density. Also, additional thermal simulation has indicated how hotspot temperatures can vary with coolant flow rate. At least one example thermal simulation has demonstrated that stator packages with two heat exchangers (such as the second, third, and fourth stator packages 700, 800, and 900) can achieve approximately 60° C. reductions in hotspot temperatures by comparison with stator packages having only a single heat exchanger (such as the stator package 102), even when the same flow rate is used for the stator packages overall (such that the flow rate within each heat exchanger of the stator packages having two heat exchangers is half that of the flow rate within the heat exchanger of the stator package with one heat exchanger). The example thermal simulation further demonstrated that a stator package having three heat exchangers (such as the fifth stator package 1000) can achieve even lower hotspots than stator packages having two heat exchangers for the same given flow rate, but there is relatively less improvement in thermal performance. The flow rate of each heat exchanger decreases as the number of heat exchangers increases, and the effective heat transfer coefficient decreases.

Notwithstanding these example thermal performance characteristics, it should further be appreciated that the performance of stator packages having two heat exchangers may be preferable to that of stator packages having three heat exchangers, or vice-versa, for other reasons. Indeed, it will be appreciated that, although different embodiments of stator packages encompassed herein can have different thermal performance characteristics such as hotspot temperatures, in practical implementations there will often be additional considerations influencing whether any given embodiment is preferable in addition to these particular thermal performance characteristics. Among other things, because each electric machine has unique thermal characteristics, different configurations of stator packages and associated heat exchanger(s) can provide the optimum (or optimal) thermal performance for different electric machines. For example, the axial length of a machine can be a significant parameter in determining the number of heat exchangers for optimum thermal performance. As the axial length of the machine increases, more heat exchangers can be utilized for optimum cooling. Similarly, the stator copper and core losses can be significant parameters affecting the optimum coolant flow rate.

Figure 16:
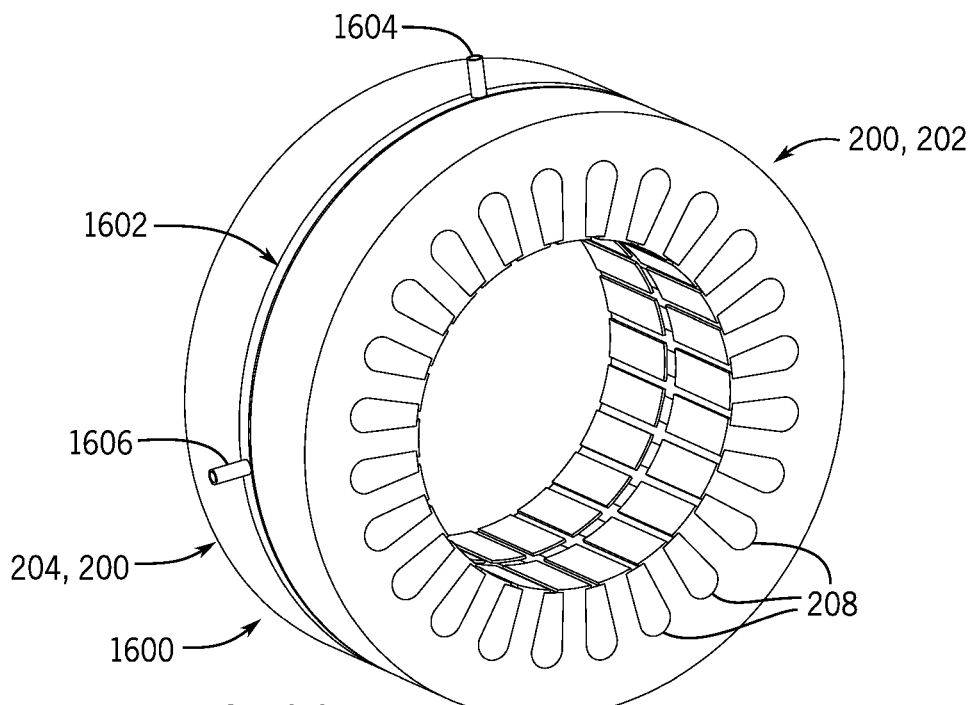
FIGS. 16, 17, and 18 respectively are schematic front perspective views of sixth, seventh, and eighth stator packages, respectively, in accordance with sixth, seventh, and eight example embodiments encompassed herein.
Figure 17:
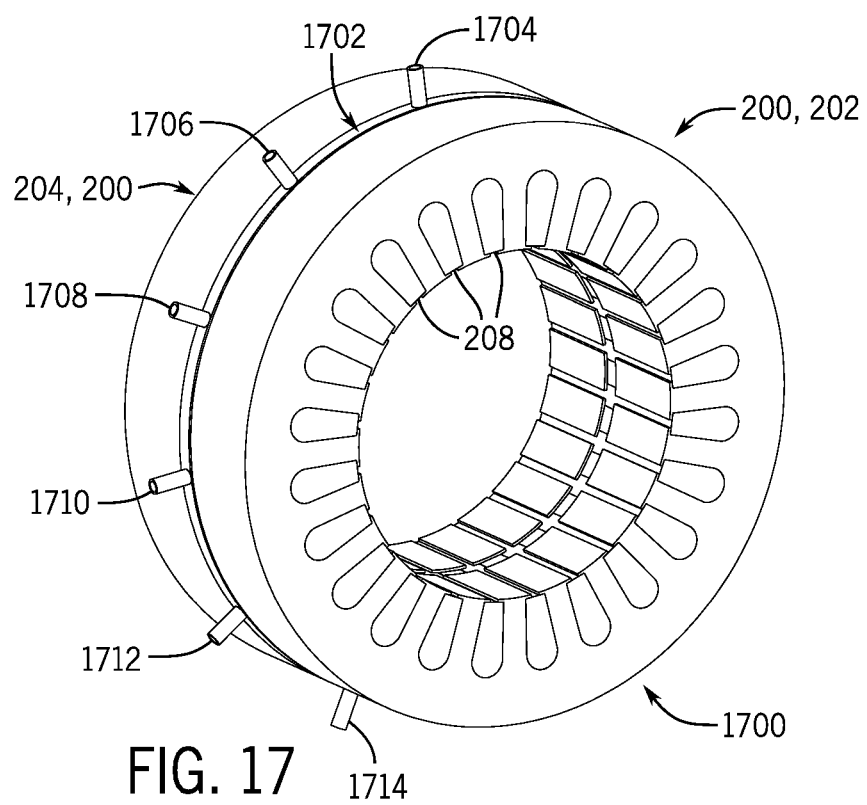

Referring now to FIGS. 16 and 17, it will be appreciated from the above description that each of the first, second, third, fourth, and fifth stator packages 102, 700, 800, 900, and 1000 employs one or more heat exchangers in which the respective inlet 120 and respective outlet 122 of the respective heat exchanger are located nearly 360° apart from one another, such that coolant entering the respective inlet 120 of the respective heat exchanger must necessarily flow circumferentially nearly 360° around that heat exchanger in order to exit at the respective outlet 122 of that heat exchanger. Nevertheless, the present disclosure also includes other embodiments in which the respective inlet and outlet of a given heat exchanger need not be positioned in this manner. For example, with respect to FIG. 16, a schematic front perspective view of a sixth stator package 1600 is provided that, in addition to including the first and second stator core portions 202 and 204 forming the stator core 200 and the stator coils 208, also includes a heat exchanger 1602. In contrast to the heat exchanger 206, the heat exchanger 1602 includes an inlet 1604 and an outlet 1606 in which the outlet is positioned substantially 90° circumferentially rotated counterclockwise from the inlet 1604. Thus, in this embodiment, coolant entering the inlet 1604 need only proceed circumferentially 90° around the heat exchanger (proceeding counterclockwise) in order to exit from the outlet 1606. Alternatively, coolant can instead (or additionally) enter the inlet 1604 and proceed 270° in a clockwise manner to exit the outlet 1606.

Referring additionally to FIG. 17, a schematic front perspective view is provided of a seventh stator package 1700 that not only includes the first and second portions 202 and 204 of the stator core 200 and the stator coils 208, but also includes a heat exchanger 1702. In this example embodiment, the heat exchanger 1702 includes each of a plurality of inlets and a plurality of outlets arranged circumferentially around the heat exchanger. More particularly, the heat exchanger 1702 includes first, second, third, fourth, fifth, and sixth ports 1704, 1706, 1708, 1710, 1712, and 1714 and, depending upon the implementation, the different respective ports 1704, 1706, 1708, 1710, 1712, and 1714 (and possibly additional ports arranged on the other side of the stator package, not shown) can alternate in terms of being inlets and outlets. For example, with respect to the ports that are shown, the ports 1704, 1708, and 1712 can be inlets and the ports 1706, 1710, and 1714 can be outlets (or vice-versa). In at least some such embodiments, coolant entering each respective one of the inlets will proceed circumferentially (either clockwise or counterclockwise) between the inlet at which it entered and a respective neighboring outlet. For example, the heat exchanger 1702 can be configured (e.g., with walls and passageways as described for example in regard to FIG. 6 above) so that coolant entering the first port 1704, third port 1708, and fifth port 1712, respectively, as respective inlets, will then proceed to flow through the heat exchanger 1702 and exit the second port 1706, fourth port 1710, and sixth port 1714, respectively, as respective outlets.

The embodiments shown in FIG. 16 and FIG. 17 are merely intended as examples. For example, FIGS. 16 and 17 are generally intended to be representative of any arrangements in which a heat exchanger has one or more respective inlets and one or more respective outlets that are respectively separated by finite angle(s) other than 360° or substantially 360°. Thus, embodiments in which a heat exchanger has a respective inlet and respective outlet that are separated by other angles other than 90 or 270 degrees, for example by way of 120 or 240 degrees, or by way of 15 or 20 degree increments, are also intended to be encompassed herein. Indeed, depending upon the embodiment, any arbitrary number of inlets or outlets can be formed in relation to a given heat exchanger, with any arbitrary circumferential spacing. Further, in some embodiments stator packages can include heat exchangers that are formed as heat exchanger assemblies of several modular heat exchangers that each extend only a fraction of the full circumference of the stator package. For example, in one such example, a heat exchanger can be formed as an assembly of two heat exchanger modules that each have an inlet and an outlet and that each extend 180 degrees, or as an assembly of three heat exchanger modules that each have an inlet and an outlet and that each extend 120 degrees. Also, in some embodiments, it is possible for coolant to flow bi-directionally. For example, supposing that the port 1708 is an inlet and each of the ports 1706 and 1710 is an outlet, it is possible for the internal walls and passageways formed within the heat exchanger 1702 to be configured so that the coolant, upon entering the port 1708, would be directed to flow to each of the ports 1706 and 1710 at which the coolant can exit the heat exchanger.

Figure 19:
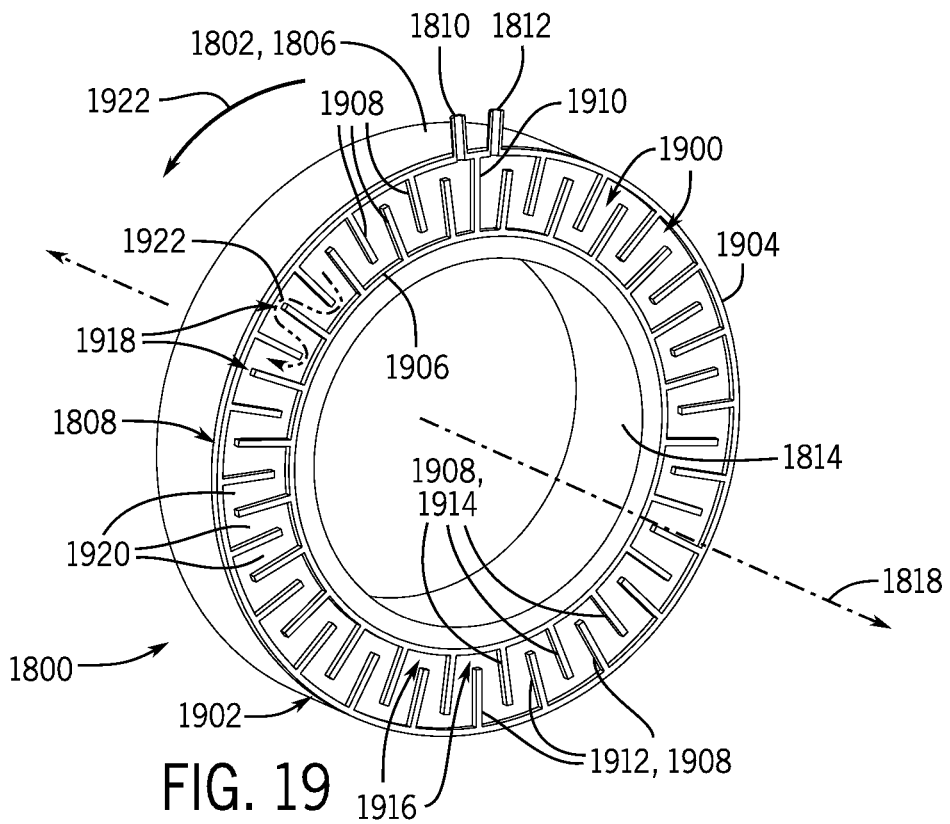
FIG. 19 is a cross-sectional view of the eighth stator package of FIG. 18 and the heat exchanger thereof, taken along a line 19-19 of FIG. 18, which also schematically illustrates example coolant flow through the heat exchanger during operation.

Additionally, although each of the first, second, third, fourth, fifth, sixth, and seventh stator packages 102, 700, 800, 900, 1000, 1600, and 1700 is a respective stator package having one or more heat exchangers (and respective stator core portions) that include respective teeth forming respective slots in which respective stator coils are positioned, the present disclosure is also intended to encompass embodiments in which teeth and slots are not present. In this regard, FIG. 19 shows a schematic front perspective view of an eighth stator package 1800 that includes a stator core 1802 having a first stator core portion 1804 and a second stator core portion 1806, as well as a heat exchanger 1808. In this embodiment, each of the stator core portions 1804 and 1806 as well as the heat exchanger 1808 is annular in shape, without any teeth that might form slots, such that the eighth stator package 1800 constitutes a slotless or toothless stator package (which can be part of a slotless or toothless electric machine). The stator core portions 1804 and 1806 and heat exchanger 1808 also extend in an annular manner around a central axis 1818, albeit the heat exchanger 1808 again includes an inlet 1810 and an outlet 1812. Further, in this embodiment, the stator coils 1814 of the stator package 1800 also are merely annular, extend around the central axis 1818, and particularly are arranged along a cylindrical surface 1816 formed along the interior of each of the first core portion 1804, second core portion 1806, and heat exchanger 1808.

Figure 18:
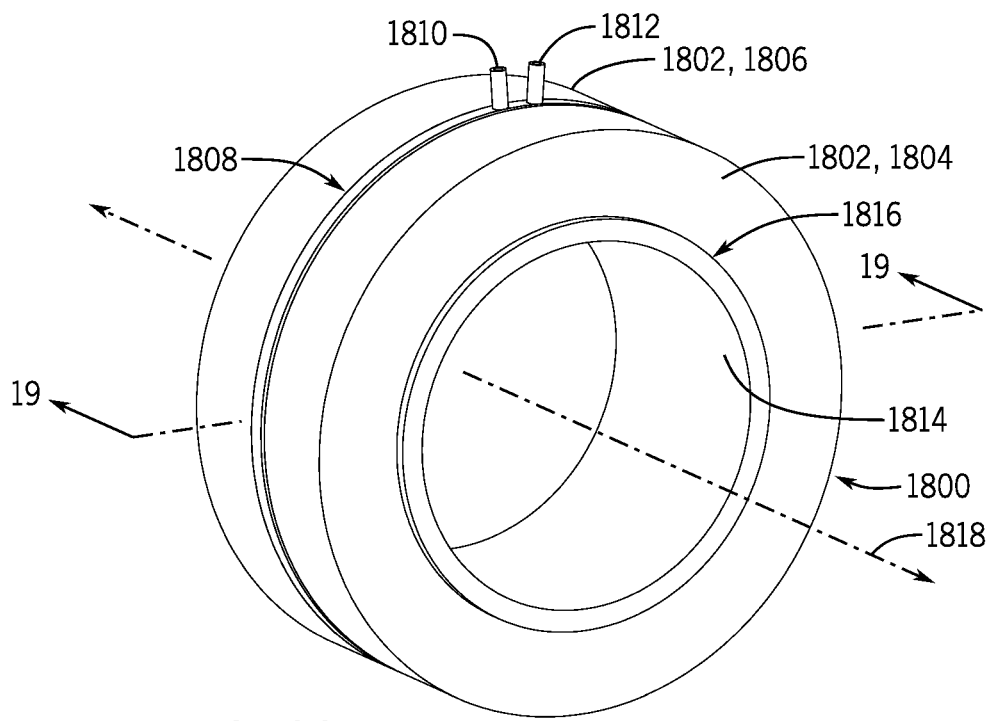

Referring additionally to FIG. 19, a cross-sectional view taken along a line 19-19 of FIG. 18 illustrates the heat exchanger 1808 in more detail and particularly shows internal passageways (or channels) 1900 that are present within the heat exchanger so as to direct fluid flow within the heat exchanger. Although not necessarily the case, the heat exchanger 1808 can again be formed from a base portion and a cover portion, and if so, the cross-section taken at line 19-19 can be along a mid-plane of the base portion (where the mid-plane is perpendicular to the central axis 1818) such that, in FIG. 19, only a portion 1902 of the base portion of the heat exchanger 1808 is shown.

As illustrated in FIG. 19, the heat exchanger 1808 and particularly the base portion 1902 thereof again includes internal walls that form passageways so as to direct coolant entering the inlet 1810 to flow in a particular manner through the heat exchanger to the outlet 1812. The walls particularly include an outer rim wall 1904, an inner rim wall 1906, a plurality of routers 1908, and a barrier wall 1910. In contrast to the earlier embodiments of the stator packages 102, 700, 800, 900, 1000, 1600, and 1700 that each have teeth and corresponding slots for the stator coils, the stator package 1800 lacks any teeth or slots. Correspondingly, the heat exchanger 1808 has a somewhat different arrangement of the routers 1908 and barrier wall 1910 by comparison with the routers and barrier walls described in those other embodiments above.

More particularly, as can be seen from FIG. 19, the routers 1908 of the heat exchanger 1808 include both inwardly-directed routers 1912 and outwardly-directed routers 1914. The inwardly-directed routes 1912 respectively extend from the outer rim wall 1904 radially inwardly toward the central axis 1818 and toward the inner rim wall 1906, but not all of the way up to the inner rim wall, such that there are gaps 1916 between the respective inwardly-directed routers 1912 and the inner rim wall 1906. Further, the outwardly-directed routers 1914 respectively extend radially outwardly, away from the inner rim wall 1906 (and away from the central axis 1818) toward, but not all of the way up to, the outer rim wall 1904, such that gaps 1918 are present between the ends of those outwardly-directed routers and the outer rim wall 1904. As for the barrier wall 1910, this wall is positioned so as to extend fully between outer rim wall 1904 and the inner rim wall 1906 at a circumferential location positioned immediately between the inlet 1810 and the outlet 1812.

It can be seen that the inwardly-directed and outwardly-directed routers 1912 and 1914 are alternatingly positioned as one circumferentially proceeds around the heat exchanger 1808 from the barrier wall 1910. Thus, respective ones of the outwardly-directed routers 1914 immediately neighbor the barrier wall 1910 on either side of that barrier wall, as one proceeds circumferentially in either direction away from that barrier wall (it should be noted that, although in the present example embodiment the barrier wall 1910 is positioned in between two of the outwardly-directed routers 1914, in alternate embodiments the barrier wall can instead be positioned between two of the inwardly-directed routers 1912). Subsequently, as one proceeds further circumferentially away from the barrier wall 1910 in either direction around the heat exchanger 1808, there are alternating ones of the inwardly-directed routers 1912 and outwardly-directed routers 1914. By virtue of this arrangement of the routers 1912 and 1914, a plurality of undulating or S-shaped passageways 1920 are formed within the heat exchanger 1808. Given the undulating passageways 1920 and the barrier wall 1910 positioned between the inlet 1810 and outlet 1812, in the present embodiment coolant entering the inlet 1810 is directed to proceed along a flow path 1922, which is represented by dashed line(s) with arrowheads indicating flow directions (and which can also be understood to represent coolant flowing through the passageways 1920). More particularly as shown, coolant following the flow path 1922 established by the passageways 1920, as formed by the various walls of the heat exchanger 1808, proceeds generally in a circumferential direction (in this example, counterclockwise about the central axis 1818), and additionally proceeds to follow both radially inwardly-directed and radially outwardly-directed paths particularly as determined by the routers 1908.

In view of the above description, it should be appreciated that the present disclosure encompasses numerous different embodiments and arrangements of heat exchangers for electric machines and electric machines having heat exchangers, and associated cooling methods. Notwithstanding the above description, the present disclosure is intended to encompass numerous additional embodiments including those disclosed herein as well as a variety of alternate embodiments. For example, in at least some additional embodiments encompassed herein, one or more heat pipes and one or more cooling jackets (which can require cut outs in the stator laminations) can be implemented in combination with one or more of the heat exchangers described herein. Additionally for example, even though several embodiments of stator packages described herein involve arrangements in which a given heat exchanger is positioned axially between two stator core portions, the present disclosure also encompasses embodiments in which a given heat exchanger is positioned axially alongside only a single stator core portion. Further for example in this regard, the present disclosure additionally encompasses modified versions of the first stator package 102 in which an additional heat exchanger is positioned axially at an end of the stator package, in front of (along the central axis 112) and in direct contact with the front surface 210 of the first stator core portion 202, or axially behind and in direct contact with the rear surface 212 of the second stator core portion 204.

Also for example, the present disclosure is intended to encompass embodiments having numerous different pumping arrangements in terms of the number of pumps, the manner in which one or more pumps are coupled to one or more heat exchangers, and the manner in which coolant is pumped into (so as to flow within) the heat exchangers of the stator packages. For example, in regard to at least some stator package embodiments in which there are two or more heat exchangers (e.g., as shown above in regard to FIGS. 7, 8, 9, and 10), the heat exchangers can be coupled in parallel with one another or in series with one another (or a hybrid of parallel-connected and series-connected heat exchangers), relative to the pumping circuit, and coolant can be pumped by a single pump to all of those two or more heat exchangers simultaneously. Alternatively, in at least some other embodiments of stator package embodiments in which there are two or more heat exchangers, there can be multiple discrete pumps that are dedicated to (and coupled to) the different heat exchangers or groups of heat exchangers (which again can be parallel-coupled or series-coupled, or a hybrid of both). In some such embodiments, different flow rates of coolant through the different heat exchangers can occur as governed by the different respective pumps, and such different respective pumps (and thus cooling operation by the respective heat exchangers) can be controlled or actuated independently of one another.

One or more of the embodiments encompassed herein can be advantageous in any of a variety of respects. For example, in at least some embodiments encompassed herein, the stator packages can achieve one or both of direct cooling of stator coils (slots and windings) and also direct cooling of a stator core (or one or more stator core portions or sub-stacks or groups of laminations) and, indeed, in at least some such embodiments, direct cooling of both the stator coils and stator core simultaneously is achieved. Such direct cooling, and particularly direct cooling of the stator core, can be advantageous for electric machines utilized in many applications, and particularly in high-speed applications in which core losses can increase significantly. Also for example, in at least some embodiments encompassed herein, electric machines having stator packages utilizing heat exchanger(s) as presented herein can achieve superior current densities and power densities (e.g., in terms of kilowatts per liter, kW/l, and/or kilowatts per kilogram, kW/kg). Because the heat exchanger(s) can be positioned between stator sub-stacks in some such embodiments of electric machines, such electric machines having stator packages with heat exchanger(s) arranged in this manner can achieve superior current densities and power densities with no degradation (or substantially no degradation) in slot fill factor.

Additionally for example, it should be appreciated that the embodiments of stator packages, heat exchangers, and electric machines employing such stator packages and heat exchangers encompass numerous different embodiments and arrangements that can be modified or adjusted to suit different operational conditions and applications. For example, by adjusting the number of heat exchangers (e.g., increasing the number of heat exchangers stacked in the stator package) and/or circumferential position of heat exchangers employed in a stator package or electric machine, one can achieve changes in the effectiveness of the cooling and/or achieve other changes to performance characteristics. Each of these characteristics can be selected or optimized to suit any target machine, application, or operational environment. At least some embodiments encompassed herein are particularly suitable for the cooling of electric machines with long axial lengths, insofar as these embodiments facilitate evacuation of heat from the middle of the stator package. By positioning one or more heat exchangers between the stator core portions (or sub-stacks) of the machine at various axial positions, effective cooling of long-axial length electric machines is achieved, which enables more homogenized temperature distribution with less hotspot temperature compared to the other conventional cooling methods (e.g., by eliminating or ameliorating hotspots within the middle of the stator package).

Indeed, the techniques and associated methods of operation encompassed herein entail significant design flexibility to achieve desired thermal requirements or other performance characteristics that are suited for different machines, applications, or environments, or suited for wide power range applications with different sizes. By comparison with conventional techniques, the techniques encompassed herein can significantly improve the thermal performance of the electric machines, for any of a variety of different machine types, and particularly for high power density applications such as electric vehicles (in which copper losses and stator core losses can be a significant thermal management concern). Unlike conventional embodiments having water jackets, which are unable to achieve direct coil cooling, at least some embodiments encompassed herein provide direct cooling of critical components in a stator assembly (at least some embodiments of heat exchangers/cooling techniques encompassed herein can also be used in combination with other methods such as water jackets). By lowering the maximum temperature experienced by electric machines such as electric motors, at least some embodiments encompassed herein can lead to more efficient machines or larger machines.

The present disclosure additionally encompasses embodiments of systems, applications, and methods that employ embodiments of electric machines, stator packages, heat exchangers, and methods of operation described above or otherwise encompassed herein. For example, at least some embodiments of stator packages having cooling structures such as described above can provide effective thermal management for any of a variety of different radial flux electric motors, generators, or other electric machines, including permanent magnet machines, internal permanent magnet (IPM) machines, surface permanent magnet (SPM) machines, synchronous machines, induction machines, and other electric machines using laminated radial stators, including traction motors and generators and long stack length electric machines. Such electric machines with such stator packages and associated cooling structures can be appropriate for implementation in electric vehicles (EVs) and hybrid vehicles, off-road vehicles, large megawatt machines used in power generation, HVAC (heating, ventilation, and air conditioning) or compressor systems, marine propulsion systems, high power density industrial drives, aerospace applications such as electric aircraft propulsion motors and generators, and any other electric machine applications. Electric machines with stator packages and associated cooling structures in which the stator packages are toothless also can be appropriate for applications such as automotive steering wheels.

It is specifically intended that the present invention not be limited to the embodiments and illustrations contained herein, and that the claims should be understood to include modified forms of those embodiments including portions of the embodiments and combinations of elements of different embodiments as come within the scope of the following claims.

What is claimed is:

1. A stator package for an electric machine, the stator package comprising:
a plurality of stator coils;
a first stator core portion arranged along a central axis and having a first stator core yoke and a plurality of first stator core teeth respectively extending radially inwardly from the first stator core yoke to respective inner ends of the respective first stator core teeth, wherein respective neighboring pairs of the first stator core teeth together with the first stator core yoke substantially define respective first stator core slots; and
a first heat exchanger arranged along the central axis and having a first inlet and a first outlet, a first heat exchanger yoke, and a plurality of first heat exchanger teeth extending radially inwardly from the first heat exchanger yoke to respective inner ends of the respective first heat exchanger teeth, wherein respective neighboring pairs of the first heat exchanger teeth together with the first heat exchanger yoke substantially define respective first heat exchanger slots,
wherein the first heat exchanger is positioned adjacent to the first stator core portion, wherein the respective first stator core slots are aligned with the respective first heat exchanger slots, and wherein each of the stator coils extends through each of a respective one of the first stator core slots and a respective one of the first heat exchanger slots,
wherein the first heat exchanger includes a plurality of first walls forming at least in part a plurality of first passageways configured so that coolant entering the first heat exchanger via the inlet both flows in a first direction circumferentially around at least a first portion of the heat exchanger from the inlet to the outlet, and also flows in an undulating manner both radially inwardly and radially outwardly substantially in between the first heat exchanger yoke and the respective inner ends of one or more of the first heat exchanger teeth, such that the coolant passes in proximity to and cools one or more of the stator coils and also cools the first stator core portion,
wherein the plurality of walls includes respective first and second side walls and the respective inner ends of each of the first heat exchanger teeth, the respective first and second side walls extending between the first heat exchanger yoke and the respective inner end of the respective first heat exchanger tooth,
wherein the plurality of walls also includes a plurality of routers respectively positioned at least partly within the respective first heat exchanger teeth of the one or more of the first heat exchanger teeth, wherein each of the routers extends generally or substantially radially inwardly from an outer rim wall of the first heat exchanger yoke toward but not fully up to the respective inner end of the respective first heat exchanger tooth of the one or more of the first heat exchanger teeth, and wherein each of the routers also extends radially inwardly between the respective first and second side walls of the respective first heat exchanger tooth within which the respective router is positioned,
wherein each of the passageways is formed, within each of the first heat exchanger teeth of the one or more of the first heat exchanger teeth, at least partly by respective ones of the routers, first and second side walls, and inner ends, such that the respective passageway extends radially inwardly from a respective first region within the first heat exchanger yoke, between the respective router and the respective first side wall of the respective heat exchanger tooth within which the respective router is at least partly positioned, then extends through a respective gap between the respective router and the respective inner end of the respective heat exchanger tooth within which the respective router is at least partly positioned, and then extends radially outwardly to a respective second region within the first heat exchanger yoke, between the respective router and the respective second side wall of the respective heat exchanger tooth within which the respective router is at least partly positioned,
wherein the plurality of walls of the heat exchanger are configured so that the respective first region of a first one of the plurality of passageways is connected to the inlet, so that the respective second region of a second one of the plurality of passageways is connected to the outlet, and so that the respective second region of the first one of the plurality of passageways is connected to the respective first region of the second one of the plurality of passageways, either directly or indirectly by one or more other ones of the plurality of passageways, and wherein the plurality of walls of the heat exchanger further includes a barrier wall that extends generally or substantially radially inwardly from the outer rim wall of the first heat exchanger yoke to the respective inner end of a further one of the first heat exchanger teeth that is in addition to the one or more of the first exchanger teeth, wherein the barrier wall is positioned circumferentially between the inlet and outlet, and wherein the barrier wall serves to prevent any of the coolant from flowing directly from the inlet to the outlet without flowing through the plurality of passageways.

2. The stator package of claim 1, wherein the first heat exchanger is either additively manufactured or manufactured by way of computer numerical control (CNC) milling.

3. The stator package of claim 2, wherein the first heat exchanger includes a cover portion and a base portion that are assembled together or manufactured as a single merged piece, and wherein the first inlet and first outlet are formed as parts of the base portion, and extend substantially radially outwardly away from the central axis.

4. The stator package of claim 1, further comprising a second stator core portion having a second stator core yoke and a plurality of second stator core teeth respectively extending radially inwardly from the second stator core yoke to respective inner ends of the respective second stator core teeth, wherein respective neighboring pairs of the second stator core teeth together with the second stator core yoke substantially define respective second stator core slots;

wherein the second stator core portion is arranged along the central axis, wherein the first heat exchanger is also positioned adjacent to the second stator core portion so that the first heat exchanger is positioned between the first and second stator core portions, and wherein each respective one of the stator coils extends through each of a respective one of the second stator core slots in addition to extending through the respective ones of the first heat exchanger slots and the first stator core slots.

5. The stator package of claim 4, further comprising a second heat exchanger having a second inlet and a second outlet, a second heat exchanger yoke, and a plurality of second heat exchanger teeth extending radially inwardly from the second heat exchanger yoke to respective inner ends of the respective second heat exchanger teeth, wherein respective neighboring pairs of the second heat exchanger teeth together with the second heat exchanger yoke substantially define respective second heat exchanger slots, wherein the second heat exchanger is positioned adjacent to the second stator core portion such that the second stator core portion is positioned between each of the first and second heat exchangers.

6. The stator package of claim 5, wherein either:
a) the first inlet is circumferentially aligned with the second inlet, the first outlet is circumferentially aligned with the second outlet, and the second heat exchanger includes a plurality of second walls forming a plurality of second passageways configured so that coolant entering the second heat exchanger via the second inlet flows in the first direction circumferentially around at least a second portion of the second heat exchanger from the second inlet to the second outlet; or
b) the first inlet is circumferentially aligned with the second outlet, the first outlet is circumferentially aligned with the second inlet, and the second heat exchanger includes a plurality of second walls forming a plurality of second passageways configured so that coolant entering the second heat exchanger via the second inlet flows in a second direction circumferentially around at least a second portion of the second heat exchanger from the second inlet to the second outlet, the second direction being opposite or substantially opposite the first direction.

7. The stator package of claim 5, wherein the first outlet is circumferentially offset from the first inlet in the first direction by a first amount, wherein the second inlet is circumferentially offset from the first inlet in a second direction opposite to the first direction by either the first amount or a second amount, and wherein the second outlet is circumferentially offset from the second inlet in either the first direction or the second direction by either the first amount, the second amount, or a third amount, and wherein the second heat exchanger includes a plurality of second walls forming a plurality of second passageways configured so that coolant entering the second heat exchanger via the second inlet flows either in the first direction or the second direction circumferentially around at least a second portion of the second heat exchanger from the second inlet to the second outlet.

8. The stator package of claim 7, wherein either:
a) the second outlet is circumferentially offset from the second inlet in the second direction by the first amount, and the plurality of second walls forming the plurality of second passageways are configured so that the coolant entering the second heat exchanger flows in the second direction circumferentially around at least the second portion of the second heat exchanger; or
b) the second outlet is circumferentially offset from the second inlet in the first direction by the first amount, and the plurality of second walls forming the plurality of second passageways are configured so that the coolant entering the second heat exchanger flows in the first direction circumferentially around at least the second portion of the second heat exchanger.

9. The stator package of claim 7, wherein either:
a) the second heat exchanger is positioned at an axial end of the stator package; or
b) the stator package additionally includes a third stator core portion having a third stator core yoke and a plurality of third stator core teeth, wherein the third stator core portion is arranged along the central axis, and wherein the second heat exchanger is also positioned adjacent to the third stator core portion so that the second heat exchanger is positioned between the second and third stator core portions.

10. The stator package of claim 9, wherein (b) is true, and further comprising a third heat exchanger and a fourth stator core portion, wherein the third heat exchanger is positioned between the fourth stator core portion and either the first stator core portion or the third stator core portion.

11. The stator package of claim 1, wherein either:
a) the first outlet is circumferentially offset from the first inlet in either the first direction or a second direction by a first amount, wherein the first amount is one of substantially 360 degrees, substantially 90 degrees, substantially 120 degrees, substantially 180 degrees, substantially 240 degrees, and substantially 270 degrees; or b) the first heat exchanger includes, in addition to the first inlet and the first outlet, an additional inlet and an additional outlet, wherein the first outlet is circumferentially offset from the first inlet in the first direction by a first amount, wherein the additional inlet is circumferentially offset from the first outlet in the first direction by either the first amount or a second amount, and wherein the additional outlet is circumferentially offset from the additional inlet in the first direction by either the first amount, the second amount, or a third amount.

12. An electric machine system comprising the stator package of claim 1 and additionally a rotor, and configured to operate either as a motor or a generator.

13. An electric machine comprising:

a rotor; and a stator package including one or more stator coils, a first stator core portion, a second stator core portion, and a first heat exchanger, wherein the first stator core portion, second stator core portion, and first heat exchanger are arranged successively along a central axis, with the first heat exchanger being positioned adjacent to and between the first and second stator core portions, wherein each of the one or more stator coils is arranged to extend along or within each of the first stator core portion, first heat exchanger, and second stator core portion, and wherein the first heat exchanger includes a first inlet and a first outlet, and also includes a plurality of first walls forming a plurality of first passageways configured so that coolant entering the first heat exchanger via the inlet both flows in a first direction circumferentially around at least a first portion of the heat exchanger from the inlet to the outlet, and additionally flows in an undulating manner both radially inwardly and radially outwardly substantially in between outer and inner wall surfaces of the heat exchanger, such that the coolant passes in proximity to and cools the one or more of the stator coils and the first and second stator core portions, and wherein:

the plurality of first walls of the first heat exchanger includes an outer rim wall, an inner rim wall, and a plurality of routers within the first heat exchanger that are distributed circumferentially around the first heat exchanger between an inlet and an outlet of the first heat exchanger, the plurality of routers include first routers that extend radially inwardly from the outer rim wall toward, but not up to, the inner rim wall, and second routers that extend radially outwardly from the inner rim wall toward, but not up to, the outer rim wall, the first routers and second routers are alternatingly distributed circumferentially around the first heat exchanger, and the first and second routers are configured so that the coolant flows in the undulating manner both radially inwardly and radially outwardly substantially as the coolant flows between successive neighboring pairs of the first and second routers.

14. A system employing the electric machine of claim 13, wherein the system includes one of a traction motor or generator in a hybrid or electric vehicle, an electric aircraft propulsion motor or generator, a marine propulsion device, or a compressor motor, and wherein the electric machine additionally includes a coolant circuit having a pump coupled at least indirectly to the inlet, and a control circuit including a controller and at least one inverter coupled at least indirectly to the one or more stator coils.

15. A stator package for an electric machine, the stator package comprising:

a plurality of stator coils;

a first stator core portion arranged along a central axis and having a first stator core yoke and a plurality of first stator core teeth respectively extending radially inwardly from the first stator core yoke to respective inner ends of the respective first stator core teeth, wherein respective neighboring pairs of the first stator core teeth together with the first stator core yoke substantially define respective first stator core slots;

a first heat exchanger arranged along the central axis and having a first inlet and a first outlet, a first heat exchanger yoke, and a plurality of first heat exchanger teeth extending radially inwardly from the first heat exchanger yoke to respective inner ends of the respective first heat exchanger teeth, wherein respective neighboring pairs of the first heat exchanger teeth together with the first heat exchanger yoke substantially define respective first heat exchanger slots, wherein the first heat exchanger is positioned adjacent to the first stator core portion, wherein the respective first stator core slots are aligned with the respective first heat exchanger slots, and wherein each of the stator coils extends through each of a respective one of the first stator core slots and a respective one of the first heat exchanger slots, and wherein the first heat exchanger includes a plurality of first walls forming at least in part a plurality of first passageways configured so that coolant entering the first heat exchanger via the inlet both flows in a first direction circumferentially around at least a first portion of the heat exchanger from the inlet to the outlet, and also flows in an undulating manner both radially inwardly and radially outwardly substantially in between the first heat exchanger yoke and the respective inner ends of one or more of the first heat exchanger teeth, such that the coolant passes in proximity to and cools one or more of the stator coils and also cools the first stator core portion;

a second stator core portion having a second stator core yoke and a plurality of second stator core teeth respectively extending radially inwardly from the second stator core yoke to respective inner ends of the respective second stator core teeth, wherein respective neighboring pairs of the second stator core teeth together with the second stator core yoke substantially define respective second stator core slots, wherein the second stator core portion is arranged along the central axis, wherein the first heat exchanger is also positioned adjacent to the second stator core portion so that the first heat exchanger is positioned between the first and second stator core portions, and wherein each respective one of the stator coils extends through each of a respective one of the second stator core slots in addition to extending through the respective ones of the first heat exchanger slots and the first stator core slots; and a second heat exchanger having a second inlet and a second outlet, a second heat exchanger yoke, and a plurality of second heat exchanger teeth extending radially inwardly from the second heat exchanger yoke to respective inner ends of the respective second heat exchanger teeth, wherein respective neighboring pairs of the second heat exchanger teeth together with the second heat exchanger yoke substantially define respective second heat exchanger slots, wherein the second heat exchanger is positioned adjacent to the second stator core portion such that the second stator core portion is positioned between each of the first and second heat exchangers; and wherein either:
a) the first inlet is circumferentially aligned with the second inlet, the first outlet is circumferentially aligned with the second outlet, and the second heat exchanger includes a plurality of second walls forming a plurality of second passageways configured so that coolant entering the second heat exchanger via the second inlet flows in the first direction circumferentially around at least a second portion of the second heat exchanger from the second inlet to the second outlet; or
b) the first inlet is circumferentially aligned with the second outlet, the first outlet is circumferentially aligned with the second inlet, and the second heat exchanger includes a plurality of second walls forming a plurality of second passageways configured so that coolant entering the second heat exchanger via the second inlet flows in a second direction circumferentially around at least a second portion of the second heat exchanger from the second inlet to the second outlet, the second direction being opposite or substantially opposite the first direction.

16. An electric machine system comprising the stator package of claim 15 and additionally a rotor, and configured to operate either as a motor or a generator.

17. A stator package for an electric machine, the stator package comprising:
a plurality of stator coils;
a first stator core portion arranged along a central axis and having a first stator core yoke and a plurality of first stator core teeth respectively extending radially inwardly from the first stator core yoke to respective inner ends of the respective first stator core teeth, wherein respective neighboring pairs of the first stator core teeth together with the first stator core yoke substantially define respective first stator core slots; and
a first heat exchanger arranged along the central axis and having a first inlet and a first outlet, a first heat exchanger yoke, and a plurality of first heat exchanger teeth extending radially inwardly from the first heat exchanger yoke to respective inner ends of the respective first heat exchanger teeth, wherein respective neighboring pairs of the first heat exchanger teeth together with the first heat exchanger yoke substantially define respective first heat exchanger slots,
wherein the first heat exchanger is positioned adjacent to the first stator core portion, wherein the respective first stator core slots are aligned with the respective first heat exchanger slots, and wherein each of the stator coils extends through each of a respective one of the first stator core slots and a respective one of the first heat exchanger slots, and
wherein the first heat exchanger includes a plurality of first walls forming at least in part a plurality of first passageways configured so that coolant entering the first heat exchanger via the inlet both flows in a first direction circumferentially around at least a first portion of the heat exchanger from the inlet to the outlet, and also flows in an undulating manner both radially inwardly and radially outwardly substantially in between the first heat exchanger yoke and the respective inner ends of one or more of the first heat exchanger teeth, such that the coolant passes in proximity to and cools one or more of the stator coils and also cools the first stator core portion;
a second stator core portion having a second stator core yoke and a plurality of second stator core teeth respectively extending radially inwardly from the second stator core yoke to respective inner ends of the respective second stator core teeth, wherein respective neighboring pairs of the second stator core teeth together with the second stator core yoke substantially define respective second stator core slots,
wherein the second stator core portion is arranged along the central axis, wherein the first heat exchanger is also positioned adjacent to the second stator core portion so that the first heat exchanger is positioned between the first and second stator core portions, and wherein each respective one of the stator coils extends through each of a respective one of the second stator core slots in addition to extending through the respective ones of the first heat exchanger slots and the first stator core slots; and
a second heat exchanger having a second inlet and a second outlet, a second heat exchanger yoke, and a plurality of second heat exchanger teeth extending radially inwardly from the second heat exchanger yoke to respective inner ends of the respective second heat exchanger teeth, wherein respective neighboring pairs of the second heat exchanger teeth together with the second heat exchanger yoke substantially define respective second heat exchanger slots,
wherein the second heat exchanger is positioned adjacent to the second stator core portion such that the second stator core portion is positioned between each of the first and second heat exchangers; and
wherein the first outlet is circumferentially offset from the first inlet in the first direction by a first amount, wherein the second inlet is circumferentially offset from the first inlet in a second direction opposite to the first direction by either the first amount or a second amount, and wherein the second outlet is circumferentially offset from the second inlet in either the first direction or the second direction by either the first amount, the second amount, or a third amount, and wherein the second heat exchanger includes a plurality of second walls forming a plurality of second passageways configured so that coolant entering the second heat exchanger via the second inlet flows either in the first direction or the second direction circumferentially around at least a second portion of the second heat exchanger from the second inlet to the second outlet.

18. The stator package of claim 17, wherein either:
a) the second outlet is circumferentially offset from the second inlet in the second direction by the first amount, and the plurality of second walls forming the plurality of second passageways are configured so that the coolant entering the second heat exchanger flows in the second direction circumferentially around at least the second portion of the second heat exchanger; or
b) the second outlet is circumferentially offset from the second inlet in the first direction by the first amount, and the plurality of second walls forming the plurality of second passageways are configured so that the coolant entering the second heat exchanger flows in the first direction circumferentially around at least the second portion of the second heat exchanger.

19. The stator package of claim 17, wherein either:
a) the second heat exchanger is positioned at an axial end of the stator package; or
b) the stator package additionally includes a third stator core portion having a third stator core yoke and a plurality of third stator core teeth, wherein the third stator core portion is arranged along the central axis, and wherein the second heat exchanger is also positioned adjacent to the third stator core portion so that the second heat exchanger is positioned between the second and third stator core portions.

20. The stator package of claim 19, wherein (b) is true, and further comprising a third heat exchanger and a fourth stator core portion, wherein the third heat exchanger is positioned between the fourth stator core portion and either the first stator core portion or the third stator core portion.

* * * * *